United States Patent
Chapman et al.

(10) Patent No.: US 6,891,527 B1
(45) Date of Patent: May 10, 2005

(54) PROCESSING SIGNALS TO DETERMINE SPATIAL POSITIONS

(75) Inventors: Christopher Chapman, Watlington (GB); David L. Sandbach, London (GB); Anthony Hardie-Bick, London (GB)

(73) Assignee: Soundtouch Limited, Whitstable (GB)

( * ) Notice: Subject to any disclaimer, the term of this patent is extended or adjusted under 35 U.S.C. 154(b) by 446 days.

(21) Appl. No.: 09/869,432

(22) PCT Filed: Dec. 5, 2000

(86) PCT No.: PCT/GB00/04635

§ 371 (c)(1),
(2), (4) Date: Aug. 21, 2001

(87) PCT Pub. No.: WO01/43063

PCT Pub. Date: Jun. 14, 2001

(30) Foreign Application Priority Data

Dec. 6, 1999 (GB) .............................. 9928682

(51) Int. Cl.[7] ................................. G09G 5/08
(52) U.S. Cl. ...................... 345/158; 345/173
(58) Field of Search ................ 345/157–163, 345/173–177; 178/18.01–18.11

(56) References Cited

U.S. PATENT DOCUMENTS

| | | | |
|---|---|---|---|
| 4,514,726 A | * | 4/1985 | Whetstone et al. ......... 345/163 |
| 4,851,775 A | | 7/1989 | Kim et al. |
| 5,049,862 A | | 9/1991 | Dao et al. |
| 5,063,600 A | | 11/1991 | Norwood |
| 5,526,022 A | | 6/1996 | Donahue et al. |
| 5,666,473 A | | 9/1997 | Wallace |
| 6,351,222 B1 | * | 2/2002 | Swan et al. ............ 340/825.72 |
| 6,452,585 B1 | * | 9/2002 | Horton et al. .............. 345/158 |

FOREIGN PATENT DOCUMENTS

| | | |
|---|---|---|
| DE | 4143364 | 9/1993 |
| EP | 474232 | 3/1992 |
| EP | 590830 | 4/1994 |
| GB | 2314470 | 12/1997 |
| JP | 62216025 | 9/1987 |
| JP | 7141094 | 6/1995 |
| JP | 10213405 | 8/1998 |
| NL | 9300152 | 8/1994 |
| WO | WO93/08540 | 4/1993 |
| WO | WO97/27575 | 7/1997 |
| WO | WO97/39401 | 10/1997 |

* cited by examiner

*Primary Examiner*—Alexander Eisen
(74) *Attorney, Agent, or Firm*—James Creighton Wray; Meera P. Narasimhan

(57) ABSTRACT

An apparatus is disclosed for supplying input signals to a computer. A sensor having the form of a sphere has a touch sensitive surface for generating position data for touch events. The sensor includes orientation sensors that determine rotation with respect to the earth's magnetic and gravitational fields. Orientation data may be combined with position data to interpret the orientation of touch events on the surface with respect to the computer's display. Cursor movement or text may be generated from touch events. Preferably the sphere has a roughened surface that generates sound when touched. Position data is generated by processing signals from microphones under the sphere's surface.

19 Claims, 21 Drawing Sheets

PROCESSING SIGNALS TO DETERMINE SPATIAL POSITIONS

This application claims the benefit of GB Application No. 99 28 682.5 filed Dec. 6, 1999 and PCT/GB00/04635 filed Dec. 5, 2000.

FIELD OF THE INVENTION

The present invention relates to an apparatus for processing a signal to determine a spatial position and the method of signal processing.

BACKGROUND OF THE INVENTION

The tasks performed by the operator of a computer have defined the devices through which input data is generated. In the case of a personal computer, a keyboard and a mouse are used.

Design and operation of computer peripherals maintains the difference between computers and other equipment such as radio, hi-fi and television. The requirement of a keyboard and mouse is becoming increasingly perceived as a major barrier to the wider use of computers in a much broader range of activities.

An example is the emergence of MP3 and other related audio compression standards. These provide high quality compression of audio data. Most radio stations around the world are now able to broadcast over the internet, in additional to their traditional location in the electromagnetic spectrum. Furthermore, it has become possible to store an entire CD collection on a low cost computer hard disk. However, the computer, in its present form, is not considered as a serious alternative to radio or hi-fi devices. A similar situation exists with video data. The preferred viewing device, except when editing, is a traditional television set.

Computers are increasingly capable of receiving and manipulating many different media types within a common, easily used, computer-generated environment. However, the method of supplying input to the computer terminal has restricted the wider use of this technology. The keyboard and mouse are best operated at a desk, and this prevents computers from being considered as replacements for a broad range of conventional electronic equipment. As computer and internet technology develops, increasingly the restrictions placed upon it are in the way the user interacts with computers through an input device.

The digitisation of graphic design, video and film editing has led to the development of improved devices for interaction with image data. The most widely used of input devices in this context is the graphics tablet, which is operated in the manner of a pencil-with-paper. On a large graphics tablet, it is possible to provide an area having the function of a keyboard, and this may be operated to generate occasional text where this required.

In three-dimensional computer modelling, no single preferred peripheral device has emerged. Several systems are known, optimised for particular applications. An example of this is radio tracking, which provides three dimensions of position and three dimensions of rotation. In a virtual reality application, a radio receiver is fixed to a users head-mounted display, and the position information obtained by analysing data from a fixed transmitter is used to determine stereoscopic images for the users eyes. The images are updated so as to provide an appropriate view for the angle and position of the user's head. Similar devices may be used to track the position of a hand, including devices that use ultrasound to determine orientation. Hand gestures resulting from finger movement may be tracked using a data glove. However, none of these devices is suitable for replacing a keyboard or mouse due to the requirement to suspend the devices in space in order to generate position data in the third dimension.

Graphics tablets and three dimensional input devices may be suitable for replacing the keyboard and mouse in certain applications. However, their high cost, and other practical considerations, make them unsuitable replacements for the widespread, low cost and ubiquitous keyboard and mouse of the personal computer.

SUMMARY OF THE INVENTION

It is an aim of the present invention to provide an improved input apparatus for supplying control signals to a computer.

DETAILED DESCRIPTION OF THE PREFERRED EMBODIMENTS

Figure 1:
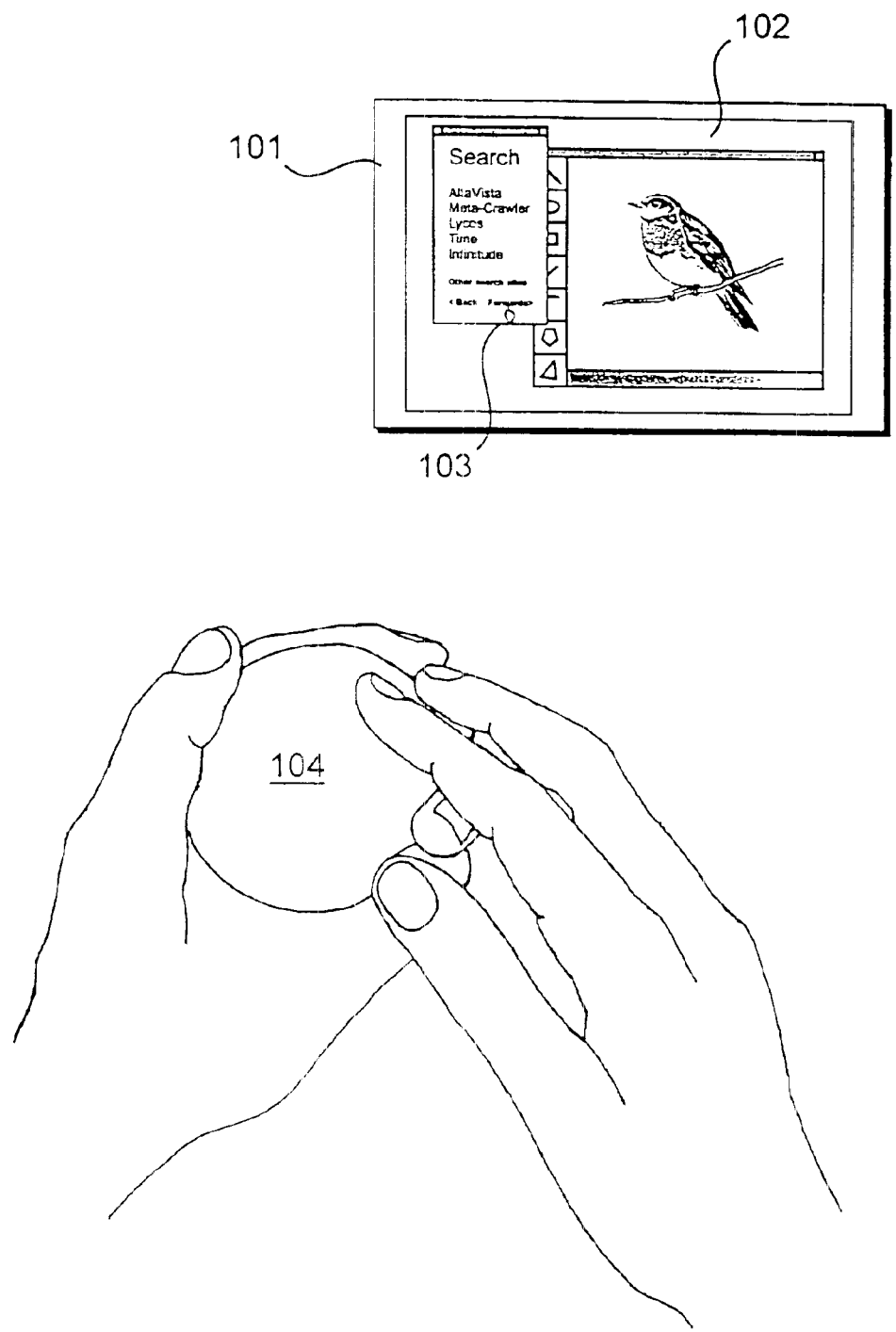
FIG. 1 shows a sensor and a computer terminal.

A computer terminal is illustrated in FIG. 1. The computer terminal 101 comprises a high resolution display panel 102 and standard personal computer circuitry. The display 102 is the only visible part of the computer. The components of the computer are built in to the display housing. The computer is connected to the internet, and provides access to media of many different types, including audio, video, applications such as word processors, and so on. This highly varied functionality is provided by the combination of an internet browser software application and a graphical user interface environment such as X-Windows. This combination of technologies, both hardware and software, with information presented through a graphical display, may be considered as a first kind of computer generated environment. A second kind of computer generated environment is one in which a three dimensional virtual world is presented on a two dimensional screen, and various forms of user input enable the user to navigate, as if physically present, in the virtual space. Virtual spaces of this type are presently used widely in games, but also for serious business applications, such as the representation of bug tracking in complex computer software development. Three dimensional virtual worlds are widely believed to be the future of the Internet, though at the present time, specific interpretations of this vision have not been sufficiently developed to provide practical engineering proposals.

In order to interact with a computer generated environment, a user must have convenient control over the position and orientation of their viewpoint. In the case of a conventional computer desktop environment, navigation involves convenient movement of a cursor or pointer 103. Furthermore, text entry is required also. The amount of text entry required depends upon the application, but these two requirements, movement and text input, can be seen as fundamental to any general purpose computer environment, of any type.

The present day windows-based desktop environment was developed over many decades, and has evolved as a result of the availability of the mouse, along with a keyboard for text entry. At the time of their development, windows and mouse-based graphical user interface environments were not considered stressful to use. However, their use on every desktop, and near constant use daily in the workplace, has resulted in various stress-related symptoms, including Repetitive Strain Injury (RSI) and Carpal Tunnel Syndrome. That these injuries exist indicates that the conventional computer interface is at least mildly stressful to use, and that better methods of input will enable worker productivity to be increased as well as potentially opening up general purpose computers to increased daily use in non-stressful leisure-related activities.

An improved computer input device is shown in FIG. 1. The computer input device 104 is spherical in shape. The sphere is approximately six centimeters in diameter. Usually, the sphere 104 is supported in the left hand, as shown, while a finger of the right hand traces across its surface in order to affect and control the position of the pointer 103 on the screen. The sphere 104 may be freely oriented in any degree, and movements of the finger are interpreted as being made with respect to the screen 102, rather than locally with respect to the surface of the sphere 104. In this way, the user can freely rotate and orient the sphere, while performing finger-movements on any part of its surface, which may then be interpreted as being performed in the space of the computer-generated environment, rather than in the physical environment of the input device 104 itself. This removes a layer of abstraction from the computer interface, and enables a language of interactions to be developed that is inherently intuitive and fast.

In a two-dimensional desktop environment, the sphere presents an infinite surface over which the mouse pointer may be moved, thus mimicking mouse movements, but accomplished entirely with movements of the fingers, and including rotations of the sphere, or ball, 104, by the left hand when necessary.

Deliberate movements of a finger across the surface are interpreted as a movement of the pointer in the computer-generated environment. Manipulations of the left hand generate touch event signals that can be ignored. The tracing of a finger across the surface of the sensor 104 is a first method of generating input data. Using a traditional computer mouse, a click or double click is used to signify an action that is performed with respect to the location of the pointer on the screen 102. This is achieved by a tap or double tap on the sensor 104, regarded as a hit. The position of the hit may be used to determine the nature of the command to be performed. However, a far wider variety of events is possible with the sphere 104.

The sphere 104 may be used to enter text characters. To signify a change from the previously described method of graphical operation, the sensor is hit, fairly hard, anywhere on its surface. Thereafter, movements of a finger on the surface may be interpreted as alphanumeric characters. Text entry may be performed one character at a time, using character recognition. Alternatively, for high speed text entry, a form of shorthand writing may be used.

Figure 2:
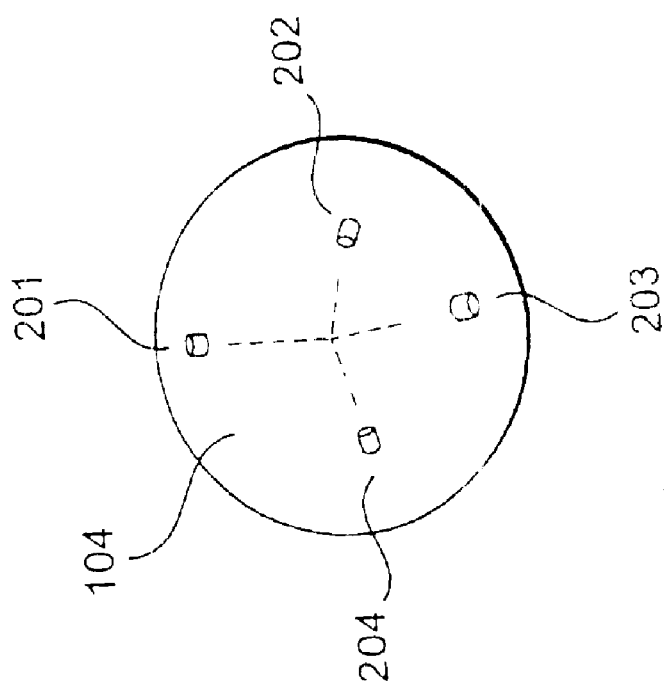

The sphere 104 has a slightly roughened surface. Friction between a finger and the surface, as the fingertip is moved across it, results in the generation of random acoustic noise. The friction-generated noise is analysed in order to determine the position of a finger-drag event of this type. The arrangement of microphone sensors to perform detection of noise generated in this way is shown in FIG. 2. The shell of the sphere comprises three millimeter thick silicone rubber, and this is covered by a fine nylon felt that provides a suitable noise-generating surface. Directly beneath the silicone rubber shell, arranged equidistant from each other, are four microphones 201, 202, 203 and 204. These have a frequency range substantially equal to that of human hearing, and can be general purpose audio microphones. Each microphone may be considered as being at the centre of a face of a three-sided pyramid, or regular tetrahedron. The angle made between any two microphones at the centre of the sphere is approximately one hundred and ten degrees.

Signals received by an individual microphone may be analysed to identify the proximity of a noise-generating drag event, and the results of an analysis of this type from two or more microphones are combined to identify the location of the touch event on the surface of the sphere.

Figure 3:
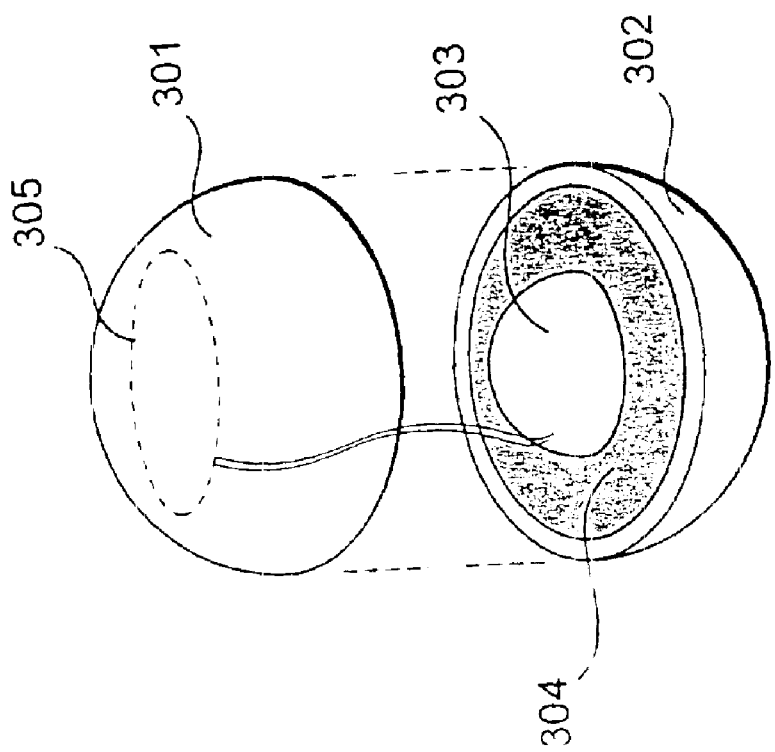
FIGS. 2 and 3 detail construction of the sensor shown in FIG. 1, including microphones and a sensor core.

Further details of the construction of the sphere 104 are shown in FIG. 3. During manufacture, the silicone rubber shell is created in two halves 301 and 302. A central core 303 contains the circuitry of the sensor. Between the core 303 and the silicone rubber shell is a layer of acoustically isolating and shock absorbant polyester fibre 304. This construction firstly ensures that microphones 201 to 204 are sufficiently acoustically isolated from each other, and that each microphone only receives sound directly from the silicone rubber shell. As a significant further advantage, however, this construction provides a very high level of shock-immunity, so that the sphere 104 may be handled extremely roughly without damage. The microphones 201 to 204 are embedded in moulded silicone rubber mountings in the shell itself.

The two halves 301 and 302 of the sphere 104 are combined using an acoustically homogeneous silicone rubber seal. The core 303 contains a rechargeable battery, and this must receive power externally when recharging is required. In order to avoid compromising the structural integrity of the surface by a wire connection, an inductive loop 305 provides contactless access to the recharging power source.

Figure 4:
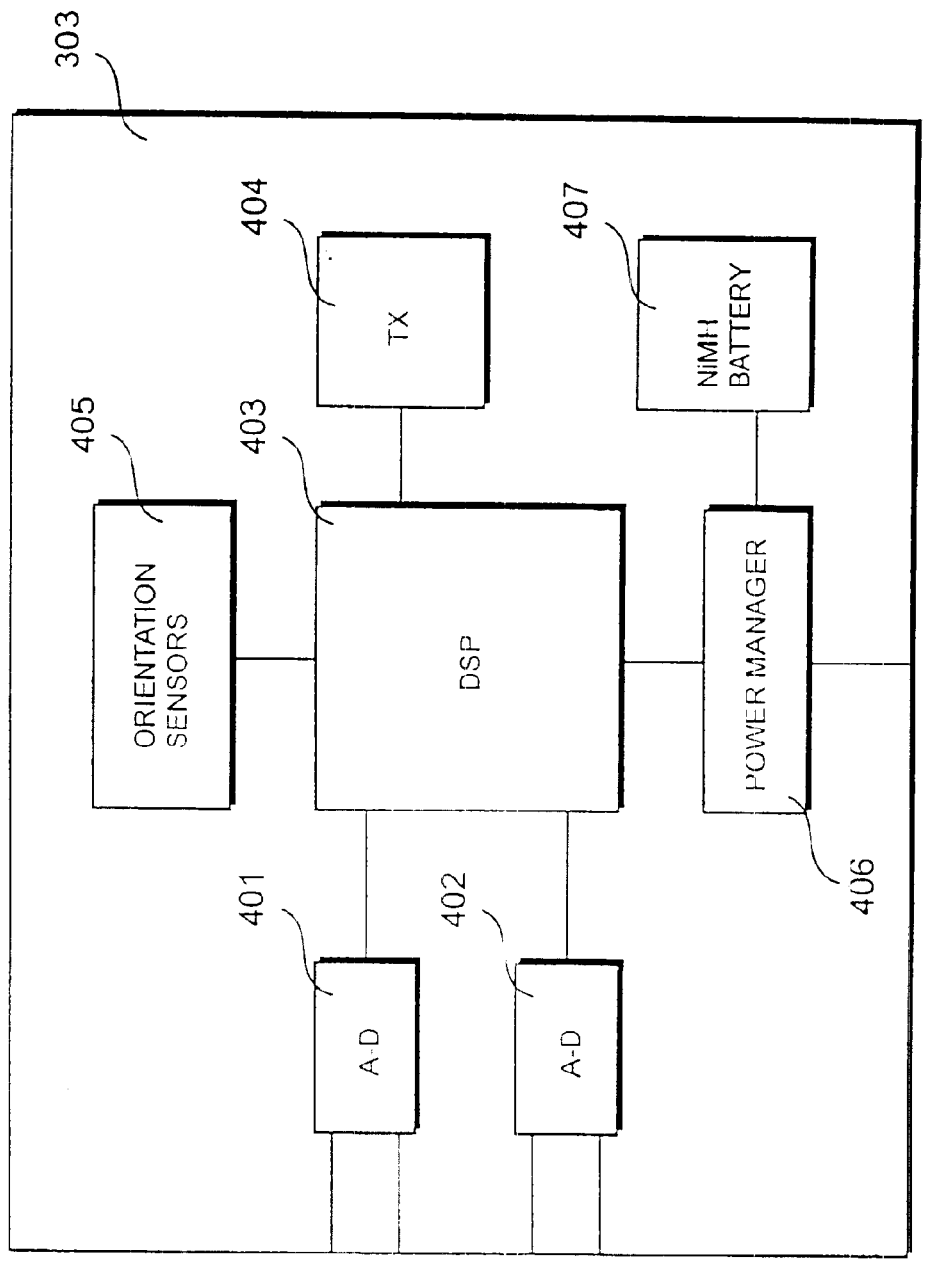
FIG. 4 details components of the sensor core shown in FIG. 3, including analogue to digital converters, orientation sensors and a digital signal processor.

Circuitry contained within the central core 303 shown in FIG. 3 is detailed in FIG. 4. A first stereo analogue to digital converter (A-D) 401 receives analogue audio signals from the first two microphones 201 and 202 a second stereo analogue to digital converter 402 receives analogue audio signals from the second two microphones 203 and 204. A suitable analogue to digital converter is the CS53L32A, made by Cirrus Logic, available from http://www.cirrus.com. The converters 401 and 402 generate a multiplexed digital audio signal that is supplied to a digital signal processor (DSP) 403. The digital signal processor is preferably a Motorola DSP56603, that includes arithmetic and memory circuitry suitable for audio signal analysis. Design data and other information about the DSP56603 is available from http://ebus.mot-sps.com.

Analysis of signals supplied to converters 401 and 402 results in touch event position signals being generated, and these are transmitted digitally from a transmitter 404 to a receiver connected to the computer terminal 101. Positional signals are generated with respect to the terminal 101, irrespective of any degree of rotation of the sensor 104. This is facilitated by orientation sensors 405. The signals from the orientation sensors define the orientation of the sphere 104 with respect to the screen 102, and thereby enable calculations to be performed that effectively remove the orientation of the sphere from the interpretation of touch events made upon its surface. Said touch events are thereafter considered and interpreted with respect to the screen, regardless of the sphere's actual orientation. From the user's point of view, the sphere always looks and feels the same, and can rotate it and operate it without concern for its orientation.

In order to measure orientation of the sphere, the orientation sensors 405 characterise sensor orientation as a first rotation RM about a horizontal axis due to the Earth's magnetic field and a second rotation RG about a vertical axis due to the Earth's gravitational field. By combining these data items with data about the positions of touch events occurring on the surface of the sphere, it is possible to interpret user touch events on the sphere with reference to a standard space in which the computer terminal 101 is located. Thus, for example, a forward dragging movement of the finger towards the screen 101 will move the cursor upwards, regardless of the sphere orientation.

The core 303 includes a power management circuit 406, that facilitates low power and shutdown modes for the DSP 403, and other circuitry. The power manager 406 receives power from a rechargeable NiMH battery 407, and also facilitates rectification and current regulation of recharging power supplied from the inductive loop 305.

Figure 5:
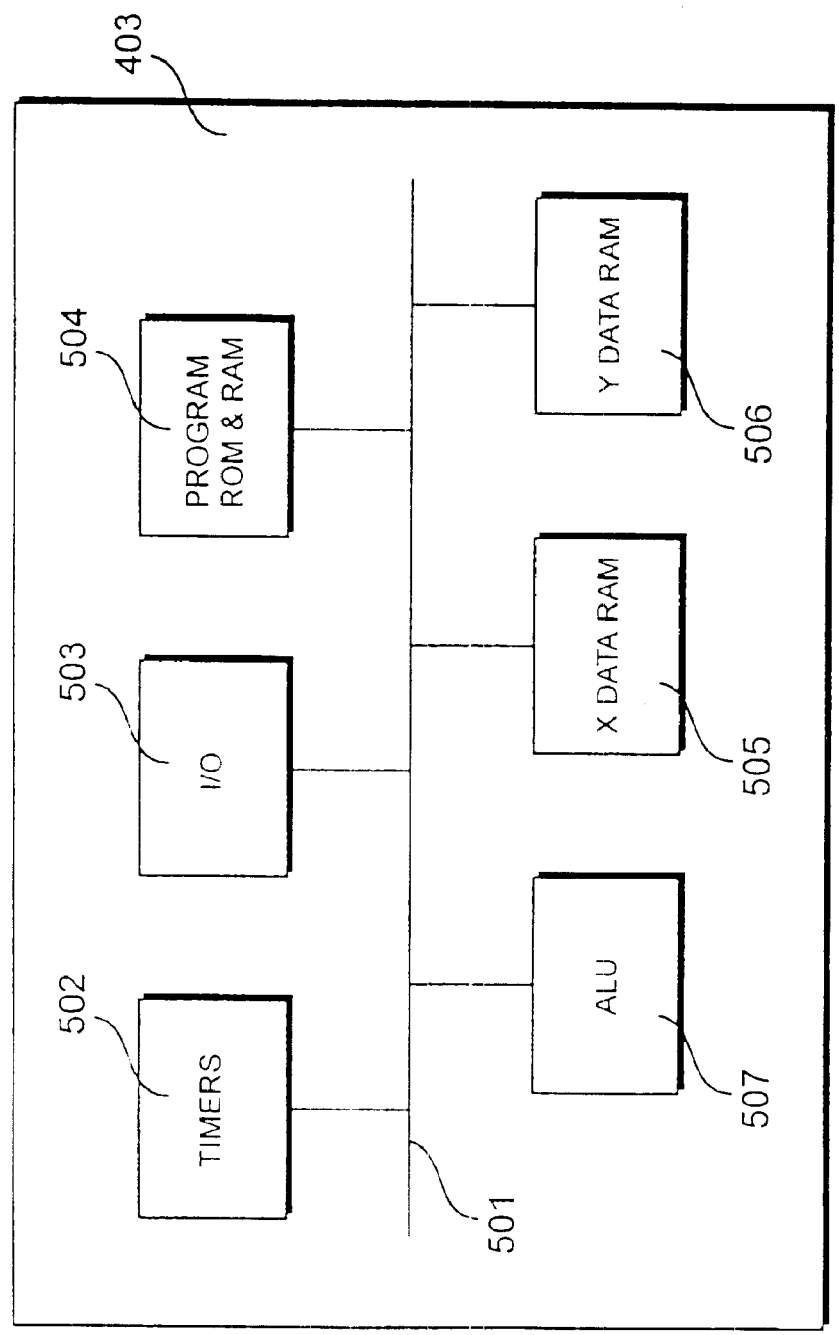
FIG. 5 details the digital signal processor shown in FIG. 4.

The digital signal processor 403 shown in FIG. 4 is detailed in FIG. 5. Several data and address busses are present within the DSP, and these are summarised for the sake of clarity by a simplified wiring connection 501. Timers 502 provide pulse width timing capabilities that are used to measure signals from the orientation sensors 405. Input and output circuits (I/O) 503 provide several physical connections from the DSP to the other components in the core, including the A-D converters 401 and 402. The program ROM and RAM 504 includes bootstrap instructions and control instructions for coordinating interface operations with other circuitry in the core 303, and for performing real time signal analysis. An X data RAM and a Y data RAM 505 and 506 provide a pair of operands per instruction cycle to an arithmetic and logic unit (ALU) 507. The ALU is thereby capable of fetching and multiplying two data operands from X and Y memory 505 and 506 in every instruction cycle. This arrangement facilitates efficient implementation of the processing algorithms that are required in order to determine the position of touch events on the surface of the sphere.

Figure 6:
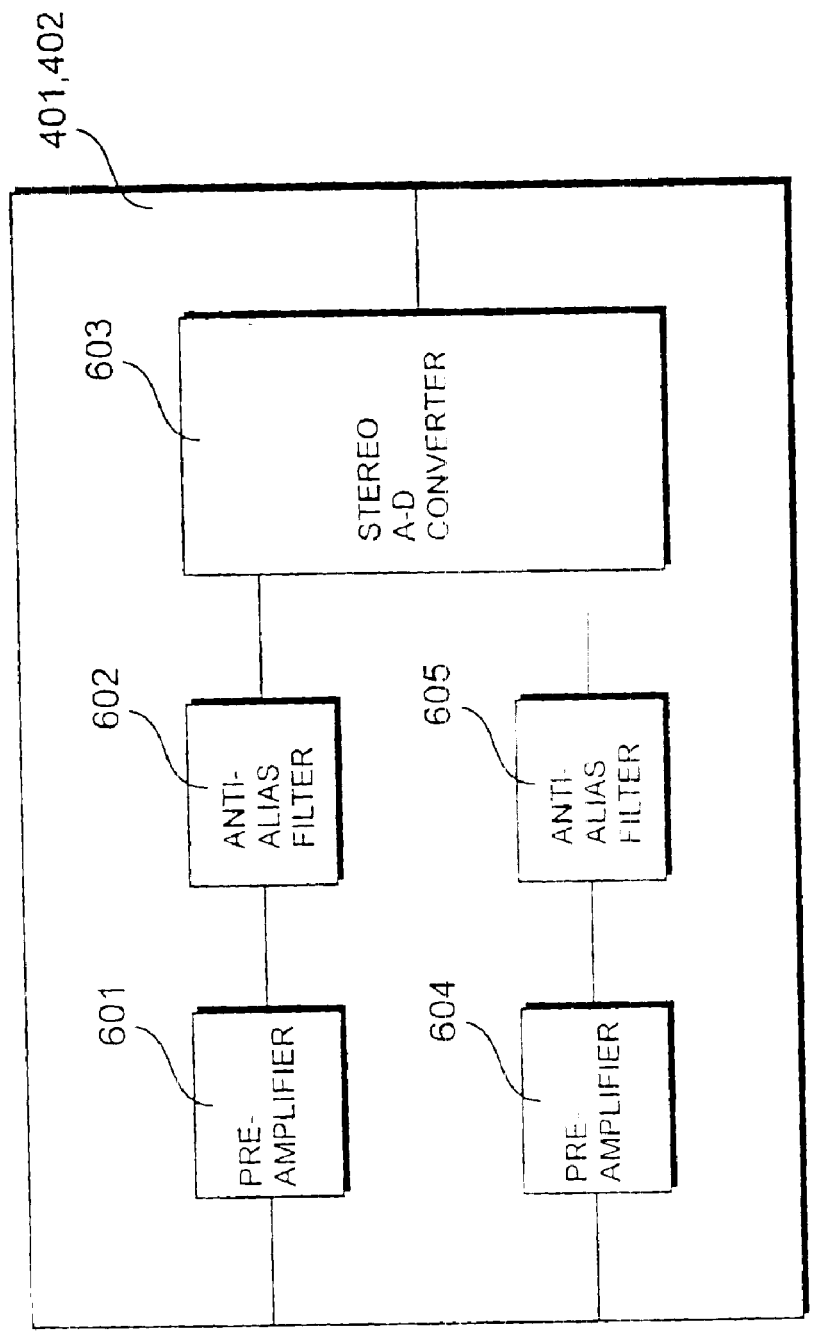
FIG. 6 details one of the analogue to digital converters shown in FIG. 4.

Each of the A-D circuits 401 and 402 comprise circuitry as shown in FIG. 6. A first channel pre-amplifier 601 receives an unamplified audio signal from a microphone and increases its intensity to that which is suitable for digital to analogue conversion. An anti-alias filter 602 removes frequency components above half the sampling rate, so as to ensure that subsequent frequency analysis of audio data gives an accurate representation of the spectrum. The output from filter 602 is supplied to the left input of a stereo sixteen bit low power analogue to digital converter chip 603. The sampling rate is 44.1 kHz. Another channel is implemented for a second microphone using pre-amplifier 604 and anti-alias filter 605. A common multiplexed output is supplied from the A-D converter chip to the DSP 403. Additional clock and word synchronisation signals have been omitted from this diagram for the sake of clarity.

Figure 7:
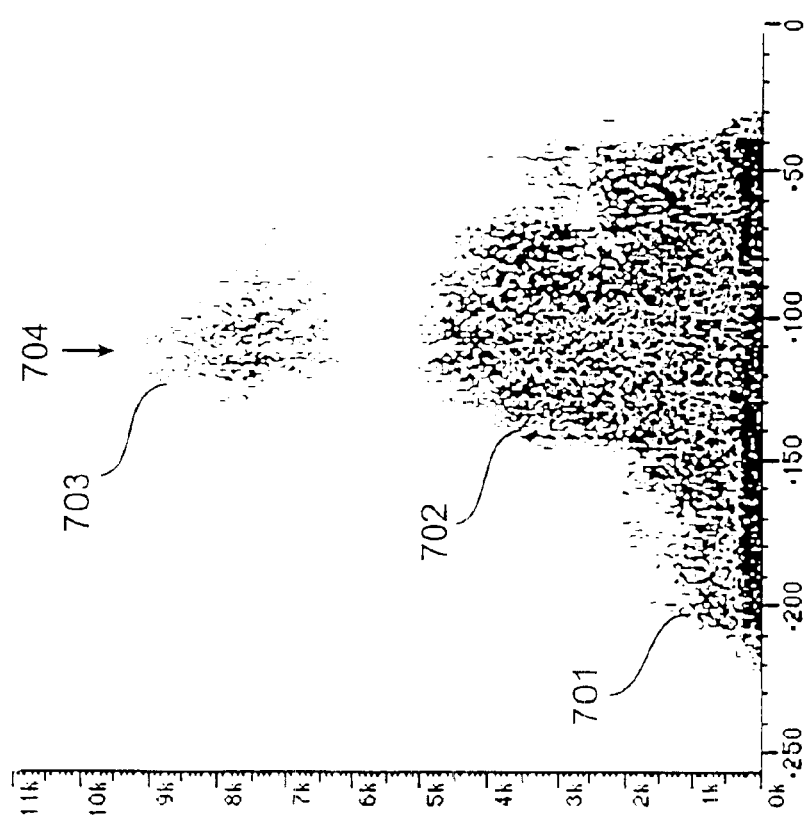
FIG. 7 details a frequency domain analysis of audio data recorded from one of the microphones shown in FIG. 2, in response to a first type of touch event.

An analysis of several seconds of audio data from a single channel is shown in FIG. 7. The vertical axis represents time, and the vertical axis represents frequency. In this graph, the amplitude of a particular frequency component at a particular time is represented by density. The graph shows a plot of a signal that results from the movement of a finger across the surface of the sphere.

At the start of the plot 701 the fingertip is distant from the microphone. Sound waves reaching the microphone are primarily transverse waves, oscillating perpendicular to their direction of propagation. The silicone rubber filters high frequencies but has little effect on the low frequencies. Thus, the signal reaching the microphone, regardless of its actual amplitude, contains an indication of the distance due to the relative strengths of high and low frequencies. As the finger tip moves closer, higher frequencies increase, while the strength of the low ones remains substantially the same. As the fingertip becomes increasingly close to the microphone, at 703, a completely new set of frequencies is added in the spectrum. This is due to longitudinal waves being transferred across the thickness of the silicone rubber from the fingertip, directly to the microphone. As the microphone is approached, there is a mixture of both longitudinal and transverse waves, as identified from the two distinct areas of the graph at 703 and 702.

A final exceptional condition is reached when the fingertip is directly over the microphone. The high frequency components are generated by the friction between the edge of the finger and the roughened surface of the sphere. However, when the finger is directly, over the microphone, these high frequency components are masked, and the sound picked up by the microphone comes from the centre of an area of the fingertip alone. At 704, a sudden loss of high frequencies occurs because these frequencies are damped by the area of the fingertip. The low frequencies exhibit a characteristic change, having a more balanced profile.

These changes provide a characteristic set of descriptions for finger dragging events that occur on the surface of the sphere. By comparing the outputs two or three channels at once, the position of a moving fingertip anywhere on the surface of the sphere 104 may be identified.

Figure 8:
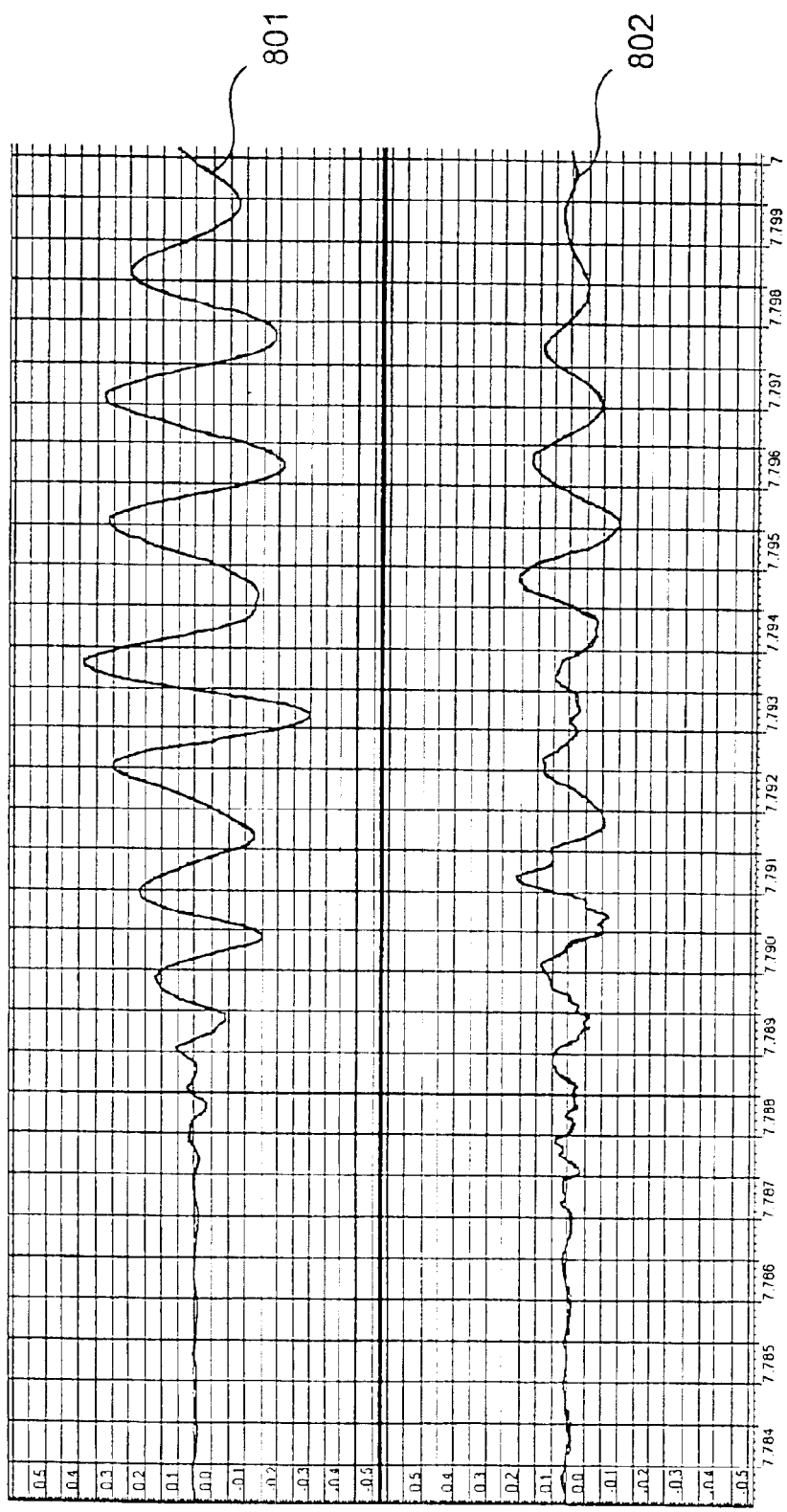
FIG. 8 details a time domain analysis of audio data recorded from two of the microphones shown in FIG. 2, in response to a second type of touch event.

Hitting the sphere, to perform the equivalent of a mouse click, does not contain as much frequency data, and so a different type of analysis is used. The speed of transverse sound waves in the silicone rubber shell is in the order of only twenty meters per second. This makes it possible to discern a time difference for wavefronts arriving at different microphones. A pair of graphs resulting from a simultaneously digitised hit event are shown in FIG. 8. Trace 801 is for the more distant microphone, and it can be seen that this commences a short period after the second trace 802. The difference in initial characteristic wavefronts is in the order of two thousandths of a second. This provides a reasonably accurate source of position data. The traces 801 and 802 also exhibit differences in frequency content, which may be observed in the jaggedness of the second trace 802, which is the microphone nearest to the hit event. Waveform 801 reaches a higher peak, due to the lack of damping provided by the finger over the point of impact just after the hit event has occurred. Several such characteristics may be analysed and the results combined so as to identify a touch event characteristic to an increased level of accuracy.

Figure 9:
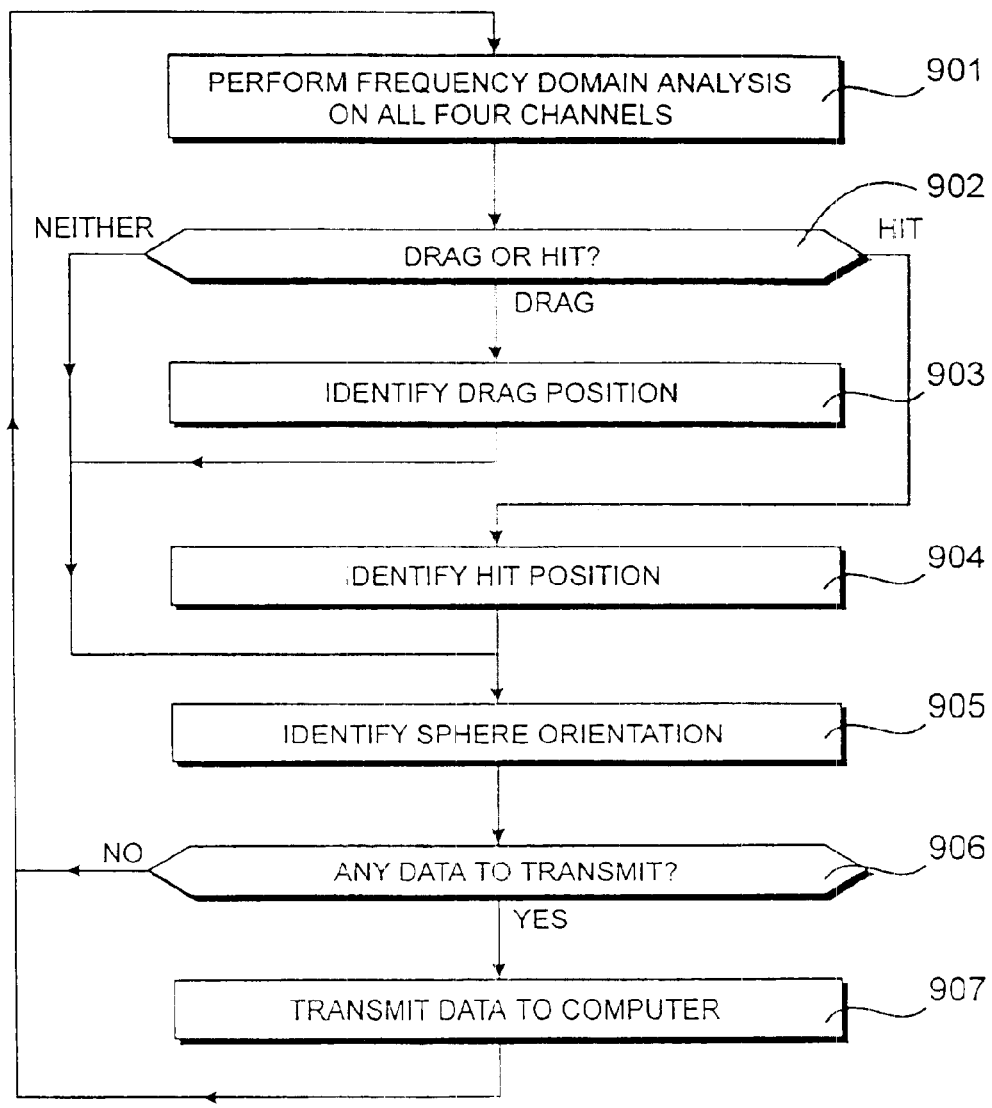
FIG. 9 details steps executed on the digital signal processor shown in FIG. 4, including a step of identifying a drag position, a step of identifying a hit position and a step of identifying sphere orientation.

The main sequence of steps performed by the DSP 403 shown in FIG. 4 is summarised in the flow chart in FIG. 9. At step 901 a frequency domain analysis is performed on each of the four channels of buffered audio data. At step 902 a question is asked as to whether a drag or a hit event has been observed in the data. It is possible that neither is identified, either due to lack of occurrence, or because a clear characteristic cannot be identified. If neither drag nor hit is present in the audio data, control is directed to step 905. If a hit is observed, control is directed to step 904, or, if a drag is observed, control is directed to step 903. At step 903 the drag position is identified. At step 904 the hit position is identified.

At step 905 the sphere orientation is identified by analysing data from the orientation sensors 405. At step 906 a question is asked as to whether any data needs to be transmitted to the computer. For example, if no touch event has occurred, and the orientation has not changed, no data need be transmitted, thus saving battery life. If no events occur over a prolonged period of time, say twenty seconds, the sensor can be placed in a power down mode. When held in either hand, even if not being used, the sensor will sense small changes in orientation, indicating that it is probably about to be used. If data is available for transmission, control is directed to step 907, where data is transferred over a serial link from the DSP 403 to the radio transmitter 404, for transmission to the computer 101.

Figure 10:
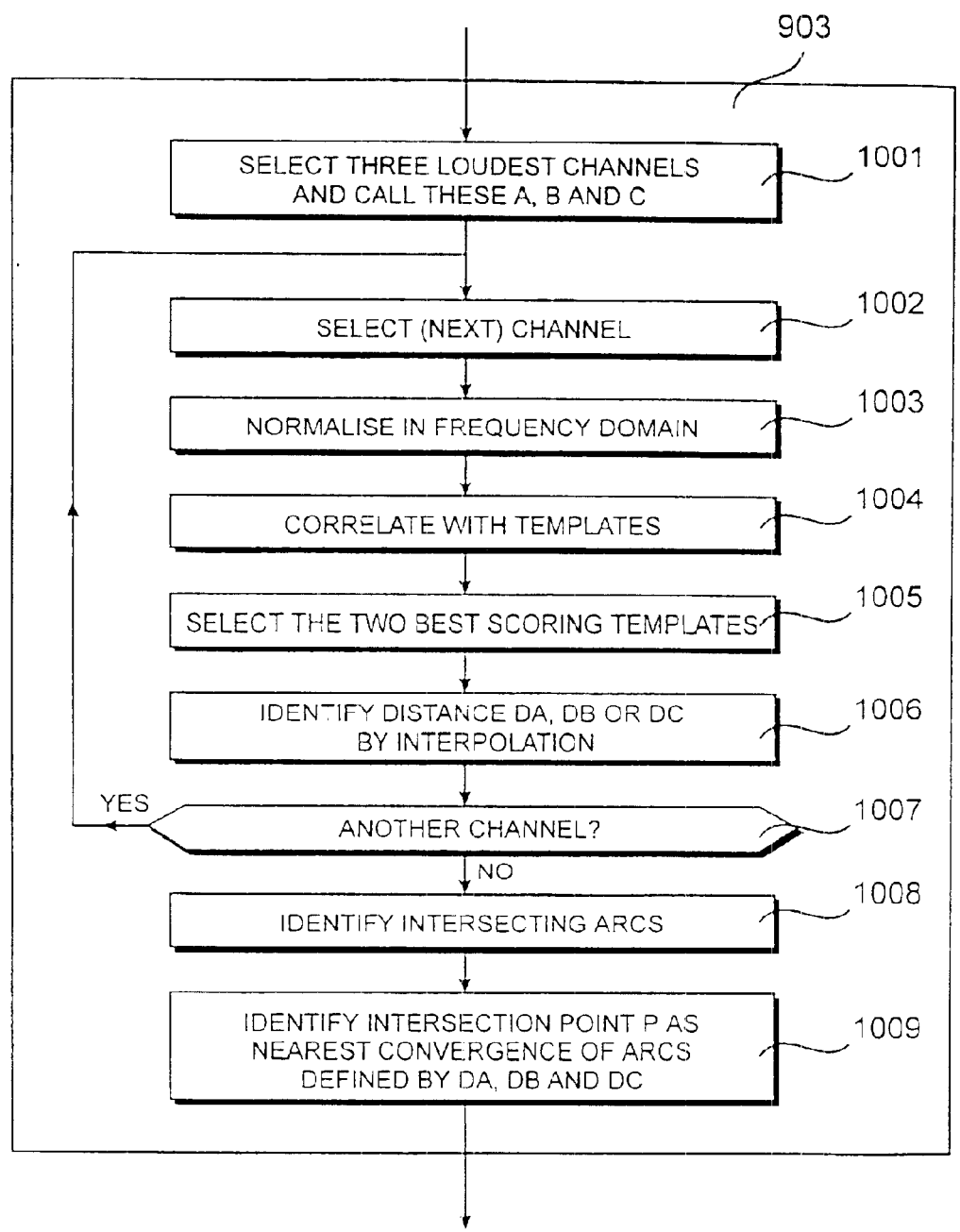
FIG. 10 details the step of identifying a drag position shown in FIG. 9, including a step of correlating with templates and a step of identifying intersecting arcs.

The step of identifying the drag position 903, shown in FIG. 9, is detailed in FIG. 10. At step 1001 the four channels of buffered audio data are analysed to identify the three with the greatest amplitude. These three are the channels whose analysis will yield the most accurate touch event characterisation. The three loudest channels are called A, B and C. At step 1002 the first of these three channels is selected. At step 1003 a frequency domain analysis is performed, and the results of this are normalised, such that the loudest frequency component has an amplitude of one. At step 1003 a correlation is performed with respect to a set of templates. Each template characterises a particular frequency response that is expected to occur at a known distance from a microphone. Thus, with reference to FIG. 7, a template exists for the frequency characteristic at 701, 702, 703 and 704. Each template has a different shape. The degree to which actual microphone data matches one of these templates indicates its proximity to the characteristic distance of that template.

A correlation score is generated as a result of step 1004, and at step 1005 the two best scoring templates are selected. It is then known that the actual distance of the event from the microphone for that channel is between the characteristic distances of these two templates. At step 1006 the actual distance is identified by interpolating between the two characteristic distances, in proportion to the difference between the template scores. This identifies the characteristic distance for the channel, which may be DA, DB or DC, depending on which channel is being analysed. At step 1007 a question is asked as to whether there is another channel remaining to be analysed. If so, control is directed back to step 1002. Alternatively, each distance DA, DB and DC will have been identified. At step 1008 intersecting arcs are identified across the surface of the sphere for each characteristic distance, and at step 1009 a point, P, is identified that is defined by the nearest point of convergence for the three arcs defined by DA, DB and DC.

Figure 11:
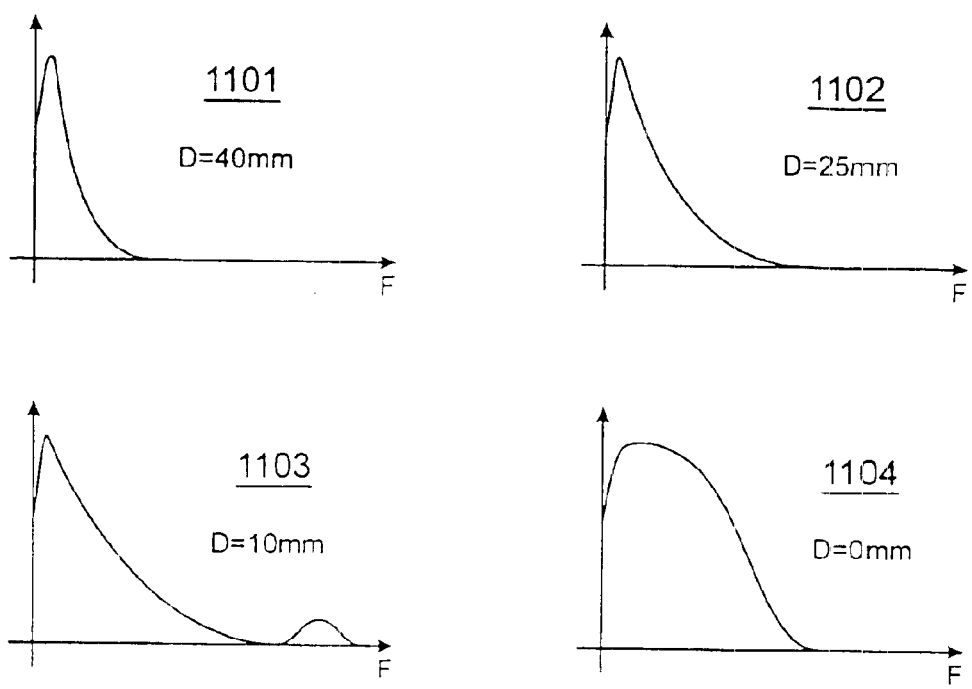
FIG. 11 details templates that are used in the step of correlating with templates shown in FIG. 10.

The templates that are used in step 1004 in FIG. 10 are illustrated in FIG. 11. Template 1101 corresponds to an ideal frequency response at a distance of D=40 mm away from a microphone. The signal at 701 in FIG. 7 would closely match this template. Template 1102 has a characteristic distance D=25 mm, and roughly corresponds to the plot at position 702 in FIG. 7. Template 1103 has a characteristic distance D=10 mm, and would provide a high score for a signal occurring just after point 703 in FIG. 7. Template 1104 corresponds to the fingertip being directly over the microphone, and corresponds to point 704 in FIG. 7. By selecting the best two corresponding templates, the actual distance of the event from the microphone may be identified by interpolation between characteristic distances of the templates.

Figure 12:
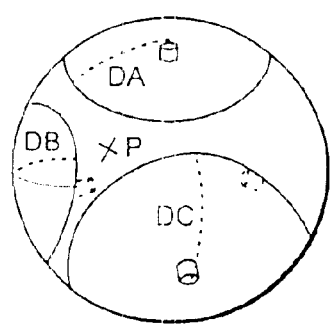
FIG. 12 illustrates the step of identifying intersecting arcs shown in FIG. 10.

The distance of an event may be considered as a notional distance, as frequency characteristics may change for different finger sizes, applied pressure and other variable factors. Whatever the distances are, DA, DB and DC define three characteristic arcs, whose ideal convergence point P is illustrated in FIG. 12. The ideal convergence point is the same regardless of these variable factors.

Figure 13:
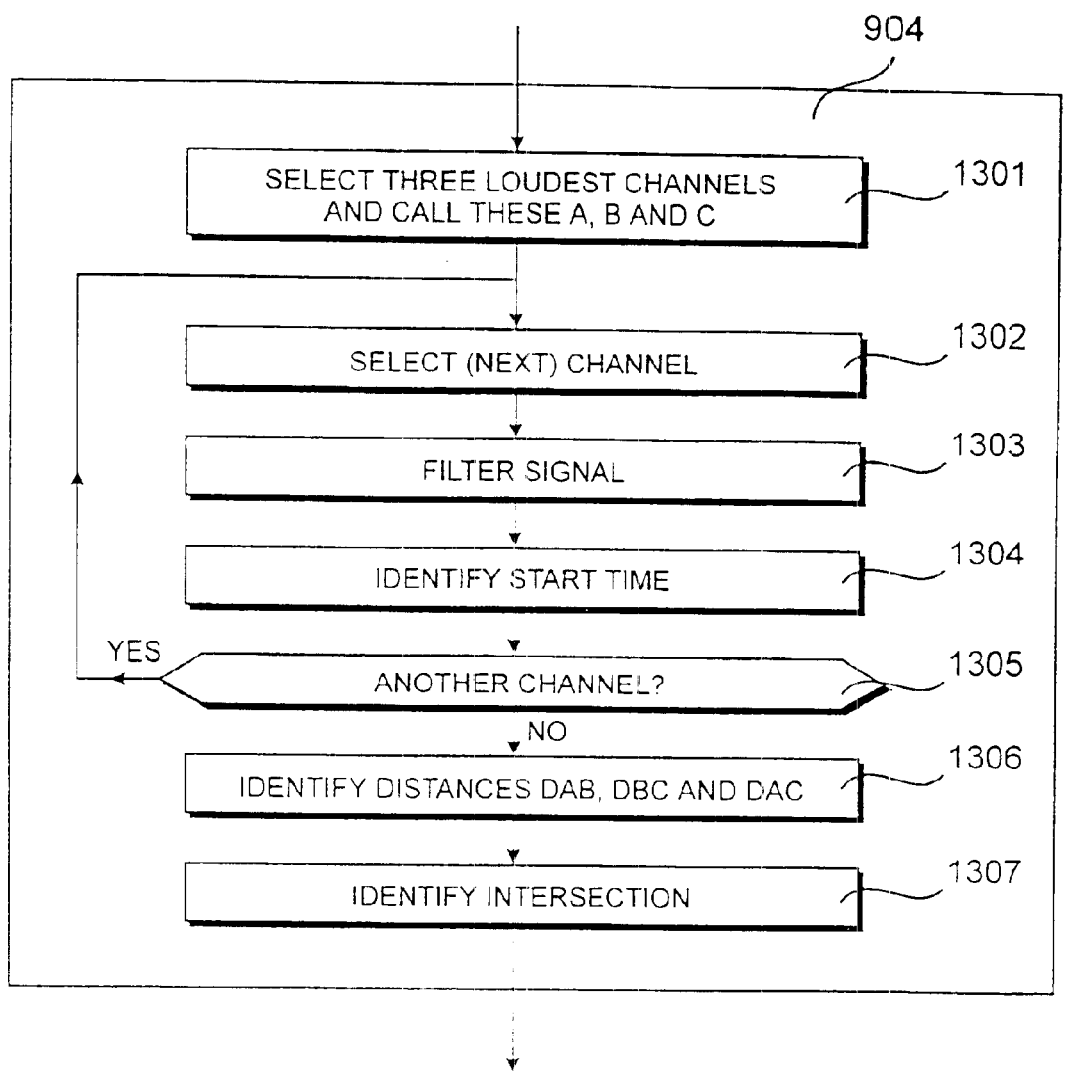
FIG. 13 details the step of identifying a hit position shown in FIG. 9.

Identification of a hit position, shown at step 904 in FIG. 9, is detailed in FIG. 13. At step 1301 the three loudest channels A, B and C are identified. At step 1302 the first of these channels is selected for analysis. At step 1303 the signal is filtered. The filter removes frequencies below two hundred and fifty Hz, as this results in a better analysis being performed. Preferably an FIR linear phase filter is used. However, an IIR filter, such as that used to generate the trace shown in FIG. 8, is acceptable, with a slightly reduced accuracy of results. At step 1304 an event start time is identified by analysing the channel data. At step 1305 a question is asked as to whether another channel remains to be analysed, and if so, control is directed back to step 1302. Alternatively, start times will have been identified for each of channels A, B and C, and control is directed to step 1306.

The difference between start times for a pair of channels identifies a distance from the mid point between two microphones. On the surface of the sphere, this mid point is expressed as a line. At step 1306 distances are identified for each combination of start times, resulting in three lines, or arcs, being identified across the surface of the sphere. At step 1307 a characteristic common point is identified, in a similar manner to that shown in FIG. 12. In theory, two such arcs are required. However, three are used to improve accuracy. Four may be used, if the channel data for all four microphones is of sufficiently high quality.

The invention provides a method of generating positional information by analysing the noise generated by friction between an object and a surface. Preferably the friction is generated by the movement of a finger across a surface. The surface may be flat, or curved, regularly or irregularly, or spherical. The surface may be elastic, temporarily or permanently deformable under finger pressure, or rigid. The invention includes any kind of interaction between a users fingers and any such surface where resulting sounds are analysed to generate position information for a computer-generated environment. Position information generated in this way may be combined with information that defines the orientation of the surface with the projection upon a display device of a computer generated environment. This combination of position and orientation information enables sound-generating touch events made upon the surface to be interpreted with respect to a computer environment, irrespective of the orientation of the surface.

Figure 14:
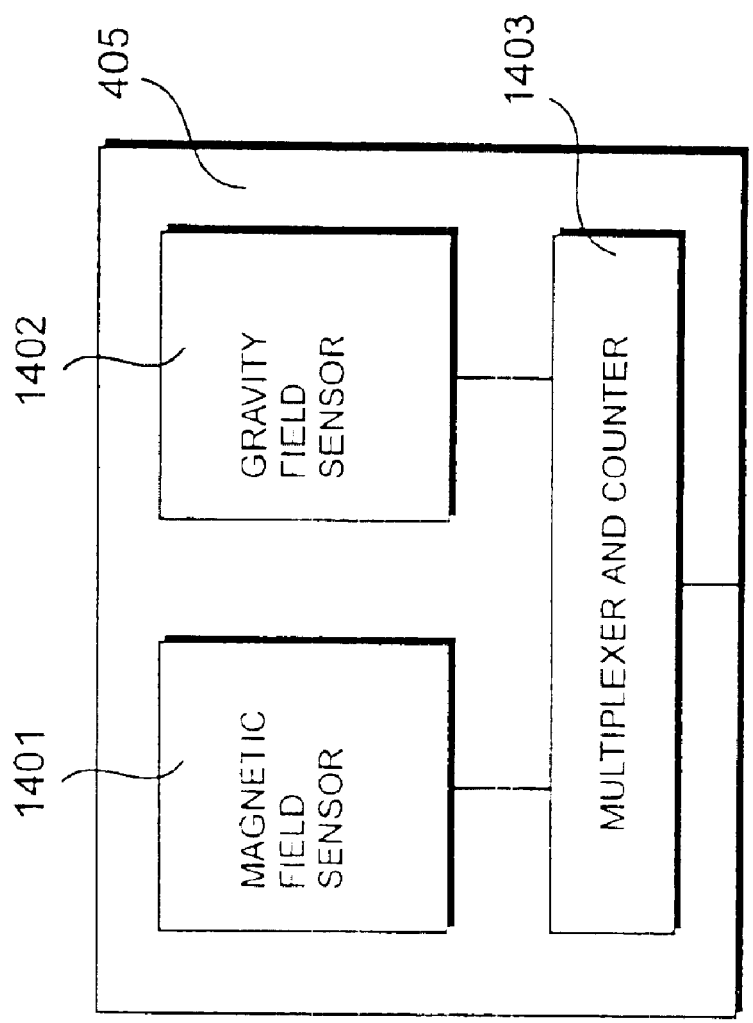
FIG. 14 details the orientation sensors shown in FIG. 4, including a magnetic field sensor and a gravitational field sensor.

Orientation of the sensor is defined by rotations RM and RG about Earth's magnetic and gravitational fields. Detail of the orientation sensors 405 shown in FIG. 4 is shown in FIG. 14. A magnetic field sensor 1401 and a gravity field sensor 1402 generate digital oscillation signals whose periods are measured in order to ascertain orientations within respective fields. A multiplexer and counter circuit 1403 provides interfacing and control signals for the oscillating circuits, and divides the frequencies down by an amount suitable for highly accurate measurement by the timers 502 in the DSP 403.

Figure 15:
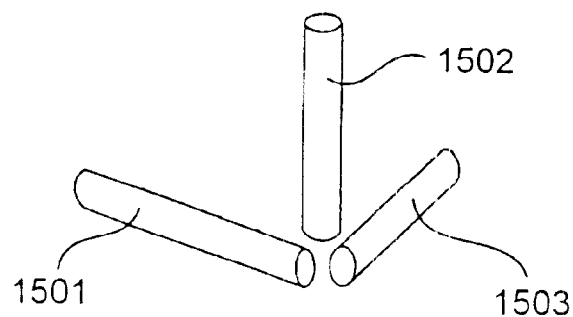
FIGS. 15 and 16 detail the magnetic field sensor shown in FIG. 14.
Figure 16:
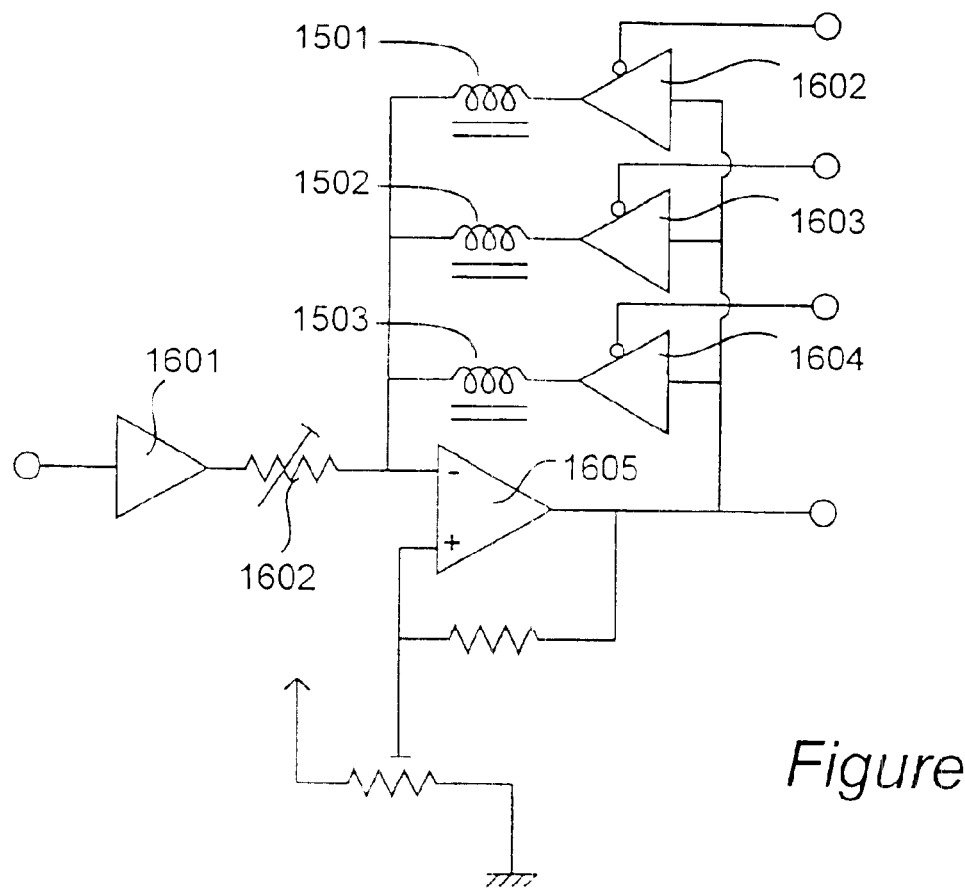

The magnetic field sensor 1401 is detailed in FIGS. 15 and 16. FIG. 15 shows three mutually orthogonal inductors. Each inductor is less than ten millimeters long. FIG. 16 details a circuit suitable for detecting the polarity and magnitude of the Earth's magnetic field with respect to each of the three inductors. A logic gate 1601 provides a positive or negative DC bias via resistor 1602 to the presently selected inductor 1501 to 1503. Selection of an inductor is provided by logical control signals supplied to tri-state logic buffers 1602, 1603 and 1604. An operational amplifier 1605 provides amplification for sustaining oscillations whose frequency is determined by the inductance of the selected inductor 1501 to 1503. The DC bias provided by resistor 1602 drives the core of the selected inductor to near saturation.

Near to saturation, a coil's inductance changes in response to the applied field, even though the coil's windings and core are fixed. The additional offset towards or away from saturation, resulting from the Earth's magnetic field, may be detected in this way. By switching polarity of the DC bias in the coil, it is possible to determine the polarity of the Earth's magnetic field when different resulting oscillation frequencies are compared. If there is no difference, this indicates that the coil is aligned orthogonally to the Earth's magnetic field. The output from the operational amplifier 1605 is supplied as a logic signal to the counter 1403, and the DSP 403 determines the precise frequency of oscillation for each of the coils, in each polarity, and thereby the alignment, in three dimensions, of magnetic North. The circuit requires a couple of milliamps of current to operate, and the sensors are extremely small and of low cost. A suitable inductor, of the type shown in FIG. 15, is the SEN-M magneto-inductive sensor, available from Precision Navigation of Menlo Park, Calif. Use of partly saturating inductors to detect the Earth's magnetic field in this way is detailed in U.S. Pat. No. 4,851,775.

Figure 17:
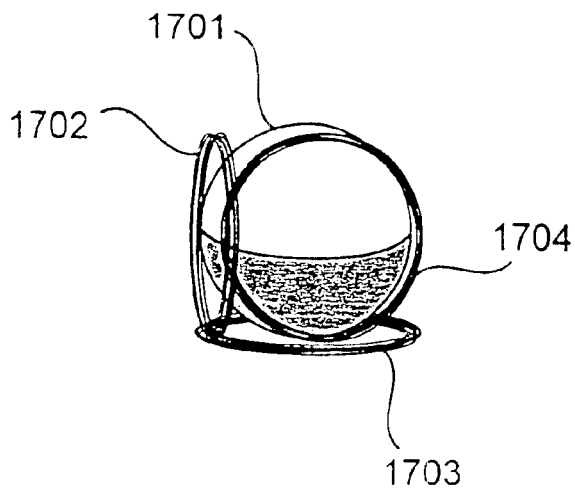
FIGS. 17 and 18 detail the gravitational field sensor shown in FIG. 14.
Figure 18:
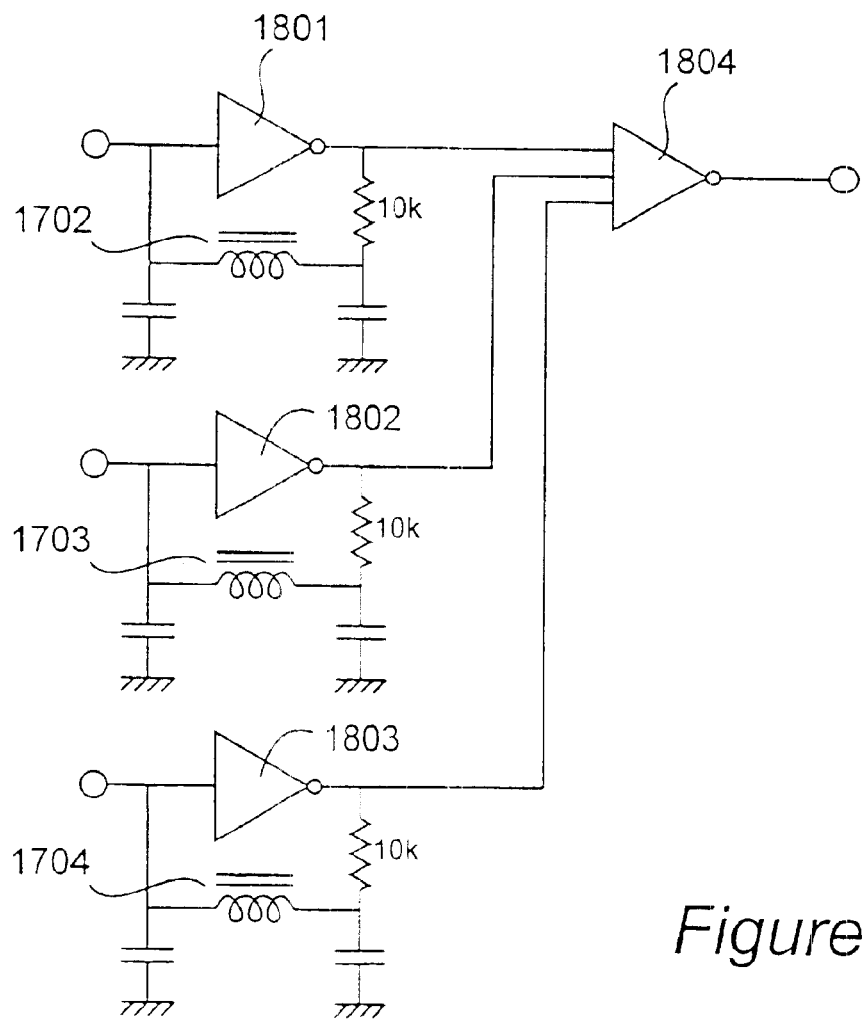

The gravity field sensor 1402, shown in FIG. 14, is detailed in FIGS. 17 and 18. An enclosed spherical container is half filled with a liquid having a substantially different relative permeability to that of free space, at a frequency of around five hundred kHz. A suitable liquid is mercury, which has a relative permeability of around 0.7 at this frequency. Three coils 1702, 1703 and 1704 are wound in close proximity to the container 1701, a and are mutually orthogonal. Each coil is connected in an oscillator circuit as shown in FIG. 18. Each coil forms the inductive part of a tuned circuit, that also comprises two capacitors. A logical HCMOS NOR gate 1801 to 1803 provides amplification and a selection input to activate the oscillator circuits separately. The outputs from the oscillators are combined in a three-input NOR gate 1804, so that an inductor selected for oscillation by a logical high input to gate 1801, 1802 or 1803, has its characteristic frequency presented as a square wave at the output of gate 1804. The output from gate 1804 is supplied to the counter circuit 1403. The frequencies of oscillation of the three coils depend upon the amount of immediately adjacent mercury. The three frequencies are measured in the DSP 403, and interpolated look-up tables are used to determine the actual orientation of the sensor with respect to the Earth's gravitational field. The circuit of FIG. 18 requires less than one milliamp to operate.

The three-dimensional vectors for magnetic and gravitational ambient fields may be represented as two rotations of the sphere, RM and RG, about the magnetic North axis, and about the vertical gravitational axis.

Figure 19:
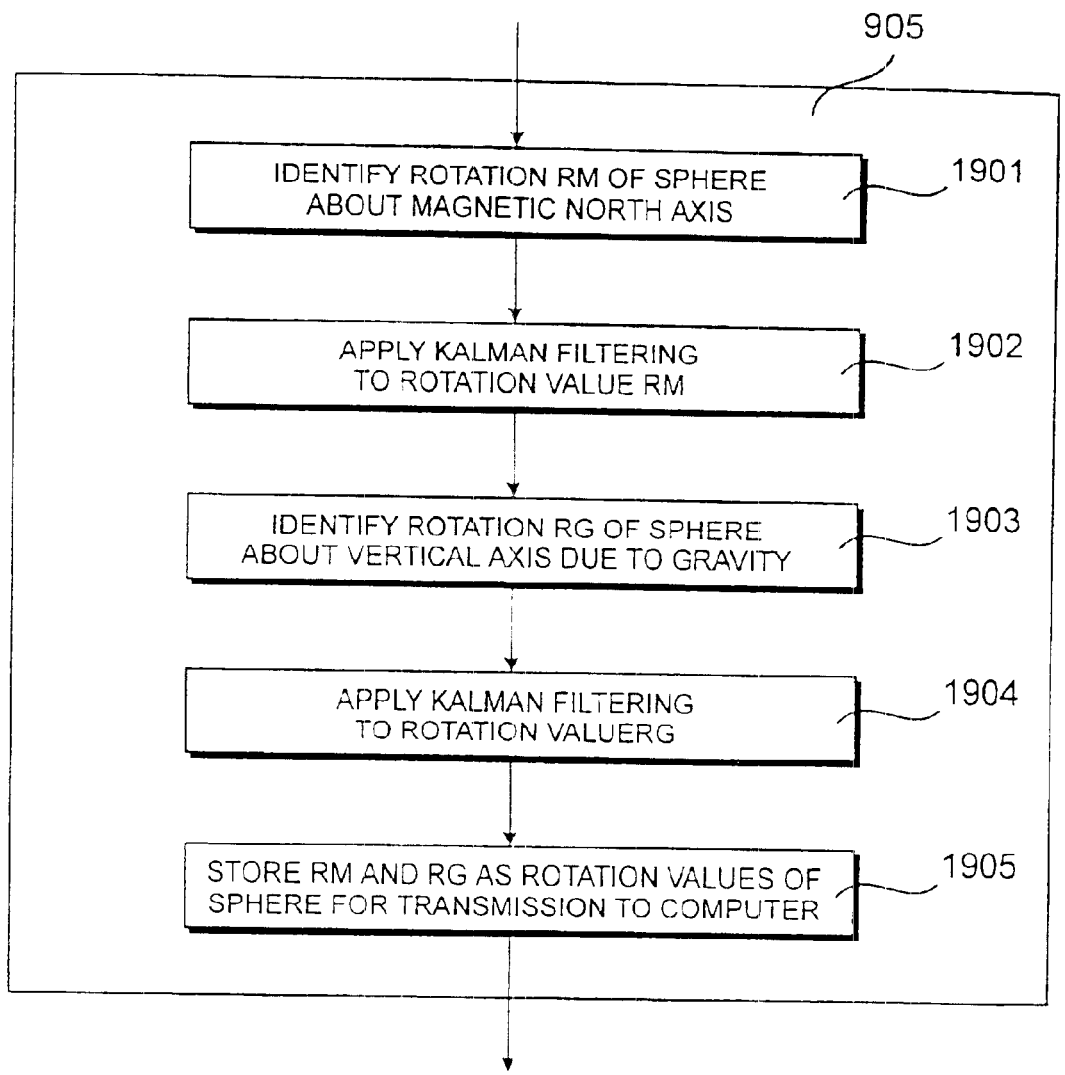
FIG. 19 details the step of identifying sphere orientation shown in FIG. 9.

The process of identifying RM and RG combines measurements from both the gravitational and magnetic field sensors. It is possible for either to experience interference, and the gravitational field sensor 1402 may experience instability due to motion of the mercury in the container 1701, particularly if the sensor is moved about rapidly. The step of identifying the orientation of the sphere 905, shown in FIG. 9, is detailed in FIG. 19. At step 1901 the rotation about magnetic North, RM, is identified. At step 1902 Kalman filtering is applied to the value of RM. A Kalman filter determines a measure of confidence in the current measurement, and increases low pass filtering when this confidence value is low. At step 1903 the rotation RG of the sphere about the vertical axis due to gravity is determined, and at step 1904 Kalman filtering is also applied to this value. At step 1905, filtered values for RM and RG are stored for later transmission to the computer 101 when necessary.

In an alternative embodiment the Earth's magnetic field can be detected using silicon sensors employing the giant magneto-resistive effect. In a further alternative embodiment the Earth's gravitational field can be detected using accelerometers, which are more expensive, but facilitate detection of rapid acceleration of the ball 104, which may be used as a further source of gestural information for navigating a computer environment.

Figure 20:
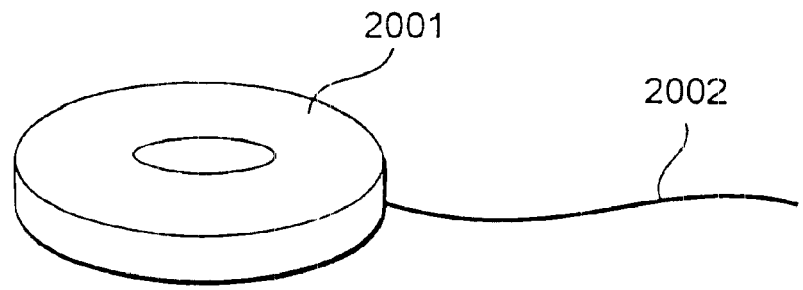
FIGS. 20 and 21 detail construction of a charger and receiver unit for use with the sensor and computer terminal shown in FIG. 1.

After an extended period of use, the battery 407 requires recharging. In order to recharge, the inductive loop 305 must be placed in an adjacent position to another matching inductive loop that is supplied by a 1 kHz power source. This may be located in a charging unit as illustrated in FIG. 20. The outside of the sphere has a mark directly opposite the location of the inductive loop 305, and this mark must be uppermost when the sphere is placed on the recharging unit 2001. The recharger 2001 may also conveniently double as the receiver for the data from the transmitter circuit 404, and a serial connection 2002 provides the connection for this data to the computer terminal 101.

Figure 21:
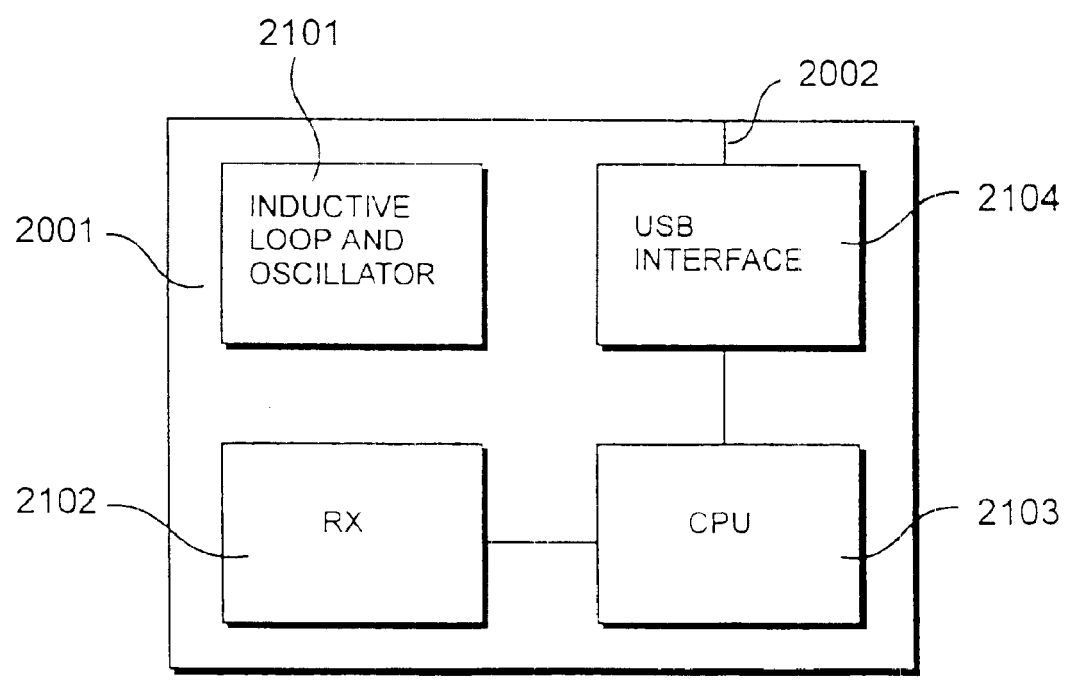

Details of the charger and receiver unit 2001 are shown in FIG. 21. An inductive loop and oscillator 2101 supply an alternating magnetic field to the inductive loop 305 in the sensor 104 during recharging. During use, the sensor 104 transmits radio signals to a radio receiver 2102. A central processing unit (CPU) 2103 provides error correction of data received over the radio link. A universal serial bus (USB) interface 2104 provides a connection to the computer terminal 101 via the serial cable 2002.

The computer terminal 101 shown in FIG. 1 is detailed in FIG. 2. A central processing unit (CPU) 2203 provides co-ordination and processing for the terminal 101. Instructions and data for the CPU 2203 are stored in main memory 2204, and a hard disk storage unit 2205 facilitates non-volatile storage of data and several software applications. A modem 2206 provides a connection to the internet. A universal serial bus (USB) interface 2207 facilitates connection to the charger and receiver unit 2001. Touch event and orientation data are received from the sphere 104 via the USB interface 2207. A graphical processor 2208 provides dedicated graphics rendering capabilities to speed up the display of high resolution graphical images on the display 102. An audio processor 2209 supplies audio signals to loudspeakers in the computer terminal 101, and receives audio signals from a microphone 2211.

Figure 22:
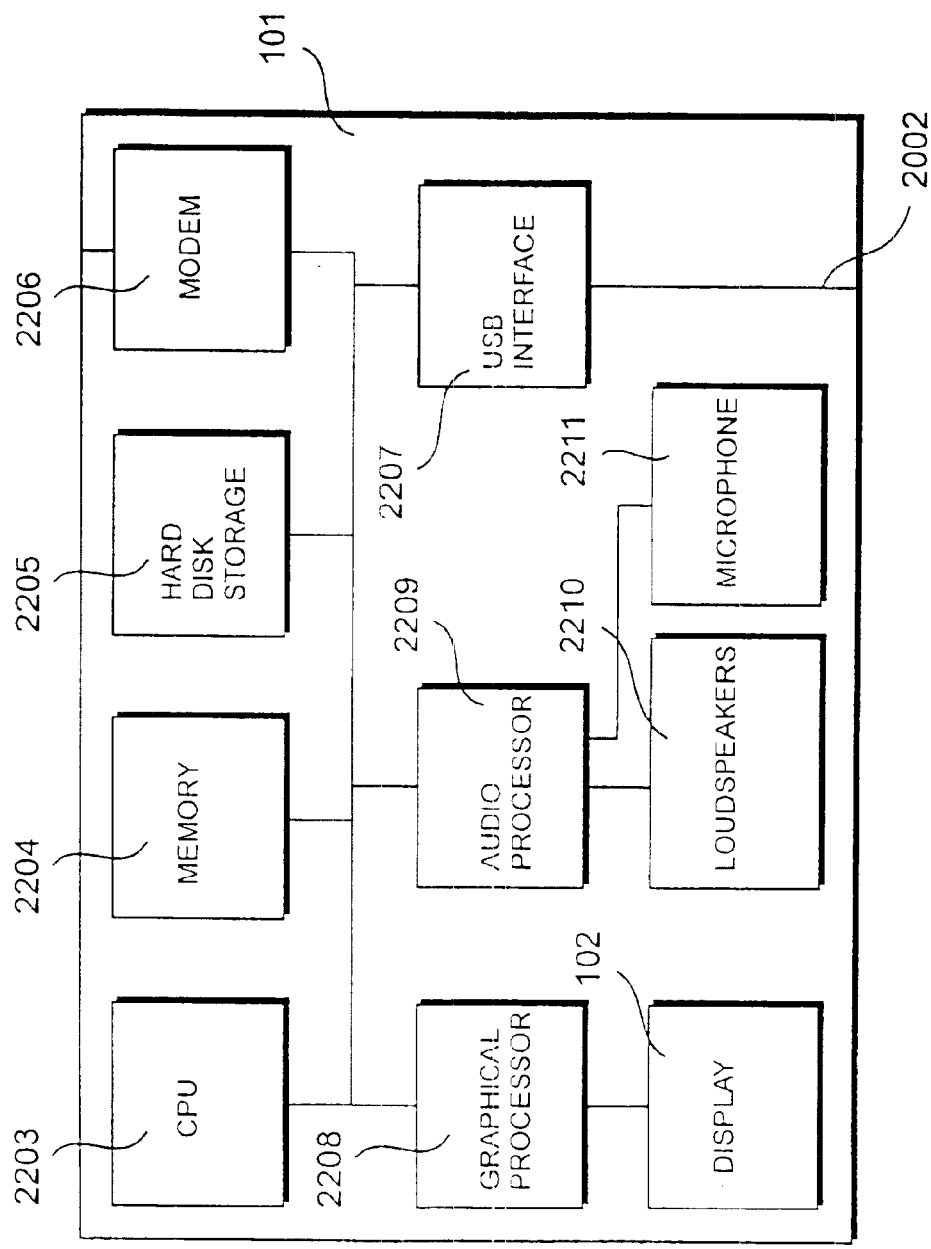
FIG. 22 details components of the computer terminal shown in FIG. 1, including a memory.
Figure 23:
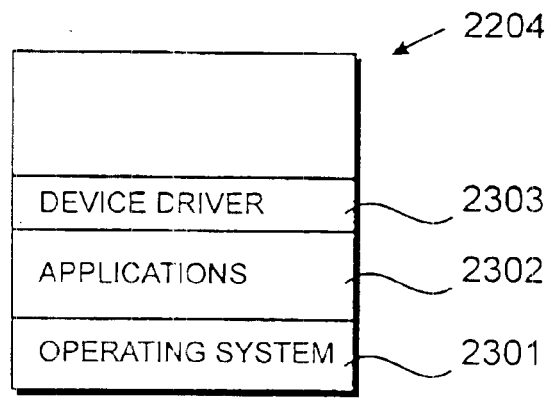
FIG. 23 details contents of the computer memory shown in FIG. 22.

The contents of the main memory 2204 shown in FIG. 22 are detailed in FIG. 23. An operating system provides common functionality for software applications 2302. A device driver 2303 for the sensor 104 is also stored in main memory 2204 while the computer terminal 101 is switched on. The sequence of operations necessary to operate the sensor 104 is detailed in FIG. 24. At step 2401 the sensor 104 is charged using the charger and receiver unit 2001 shown in FIGS. 20 and 21. At step 2402 the sensor is calibrated. In order to use the sensor, it is necessary to store orientation data so that the device driver 2303 is able to determine which way is forward, backwards, left and right with respect to the Earth's magnetic field, and therefore also substantially with respect to the terminal 101.

It is assumed herein that orientation of the sensor within the Earth's magnetic and gravitational fields effectively provides orientation with respect to the terminal 101. Clearly this would be untrue if the user operated the sensor from behind the terminal. However, for the purposes of practically operating the sensor, it may be assumed that touch gestures on the surface of the sphere 104 that are made with respect to the Earth's magnetic and gravitational fields are also made with respect to the location of the computer terminal 101. If the terminal position is changed substantially, it will be necessary to perform the calibration at step 2402 again. At step 2403 the sensor 104 is used, and at step 2404 the sensor 104 is recharged. The design of the charger and receiver unit 2001 is such that the sensor 104 may be conveniently left at rest on the charger 2001 whenever it is not in use.

Figure 24:
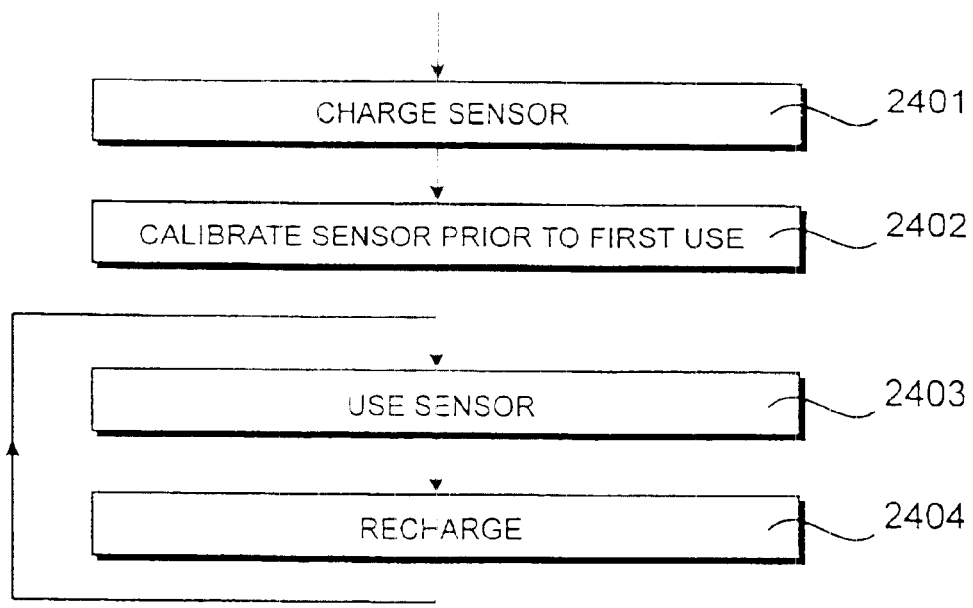
FIG. 24 summarises steps performed by the computer terminal shown in FIG. 1, including a step of calibrating the sensor and a step of using the sensor, FIG. 25 details the step of calibrating the sensor shown in FIG. 24.
Figure 25:
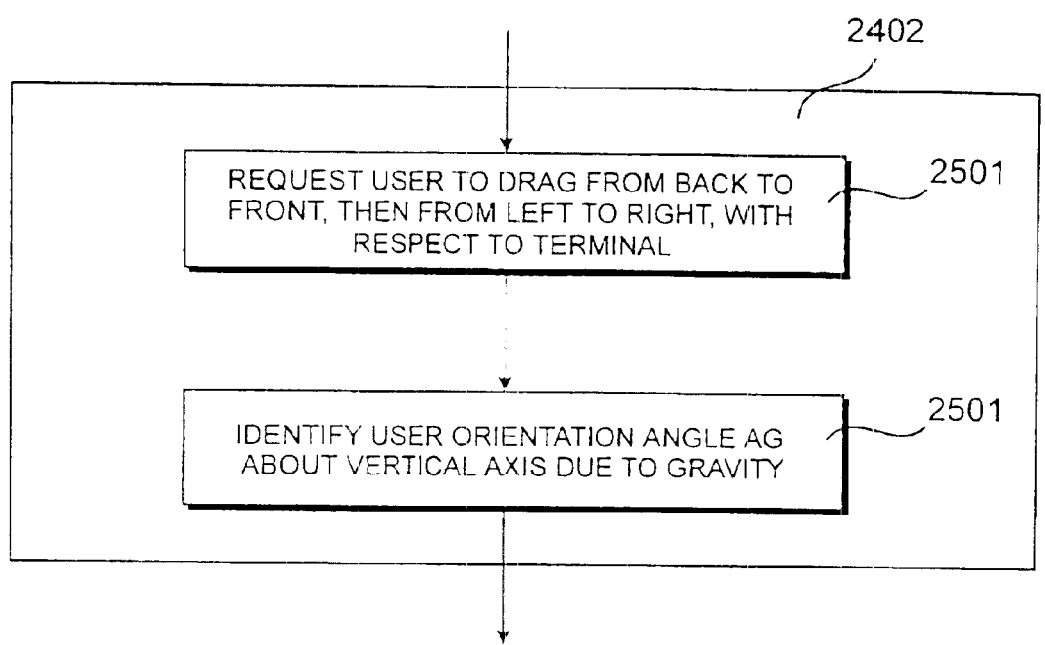

The step of calibrating the sensor 2402, shown in FIG. 24, is detailed in FIG. 25. At step 2501 the computer requests the user to drag their finger from the back to the front of the sensor, moving over the middle of the top. After this is done, the computer requests the user to drag from left to right in the same fashion. Although both are not strictly necessary, this reduces the error in calibration. At step 2502 the orientation data from the sphere 104 is analysed in order to determine a user orientation angle AG, about the vertical axis of the Earth's gravitational field.

Figure 26:
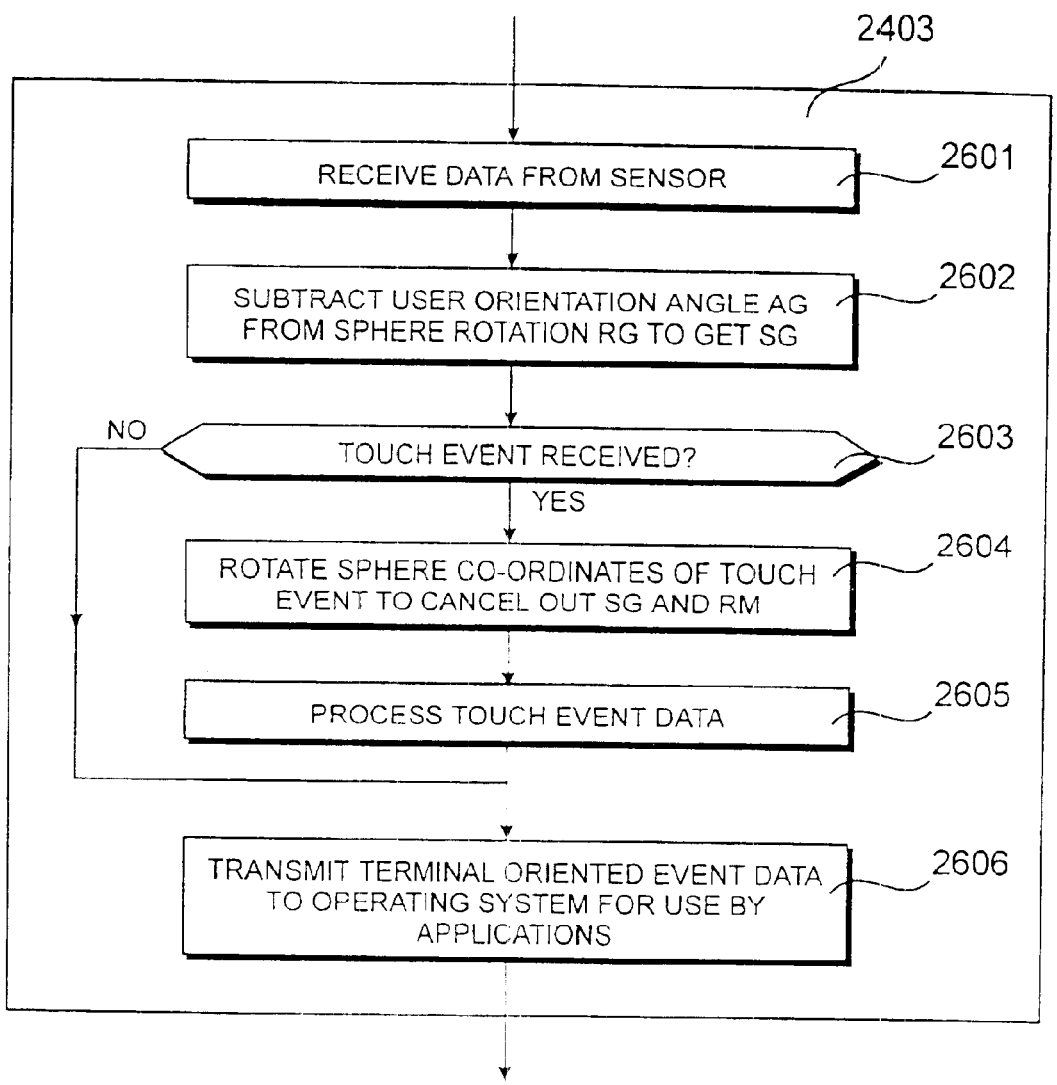
FIG. 26 details the step of using the sensor shown in FIG. 24, including a step of processing touch event data.

The step of using the sensor 2403, shown in FIG. 24, is detailed in FIG. 26. At step 2601 touch event and or orientation data is received from the sensor 104. This includes the angles of rotation RM and RG about the Earth's magnetic and gravitational fields. At step 2602 the user orientation angle AG calculated at step 2502 in FIG. 25 is subtracted from the sphere rotation angle RG in order to obtain a rotation value SG. At step 2603 a question is asked as to whether a touch event has been received. If not, control is directed to step 2606. Alternatively, control is directed to step 2604. At step 2604 the sphere co-ordinates of the touch event are rotated in opposite and equal degree to SG and RM, resulting in touch event data that has a stationary co-ordinate system, irrespective of the orientation of the sphere. At step 2605 the resulting touch event data is processed. Finally, at step 2606 the terminal-oriented data is supplied to the operating system 2301 via the device driver 2303, for use by applications 2302.

Figure 27:
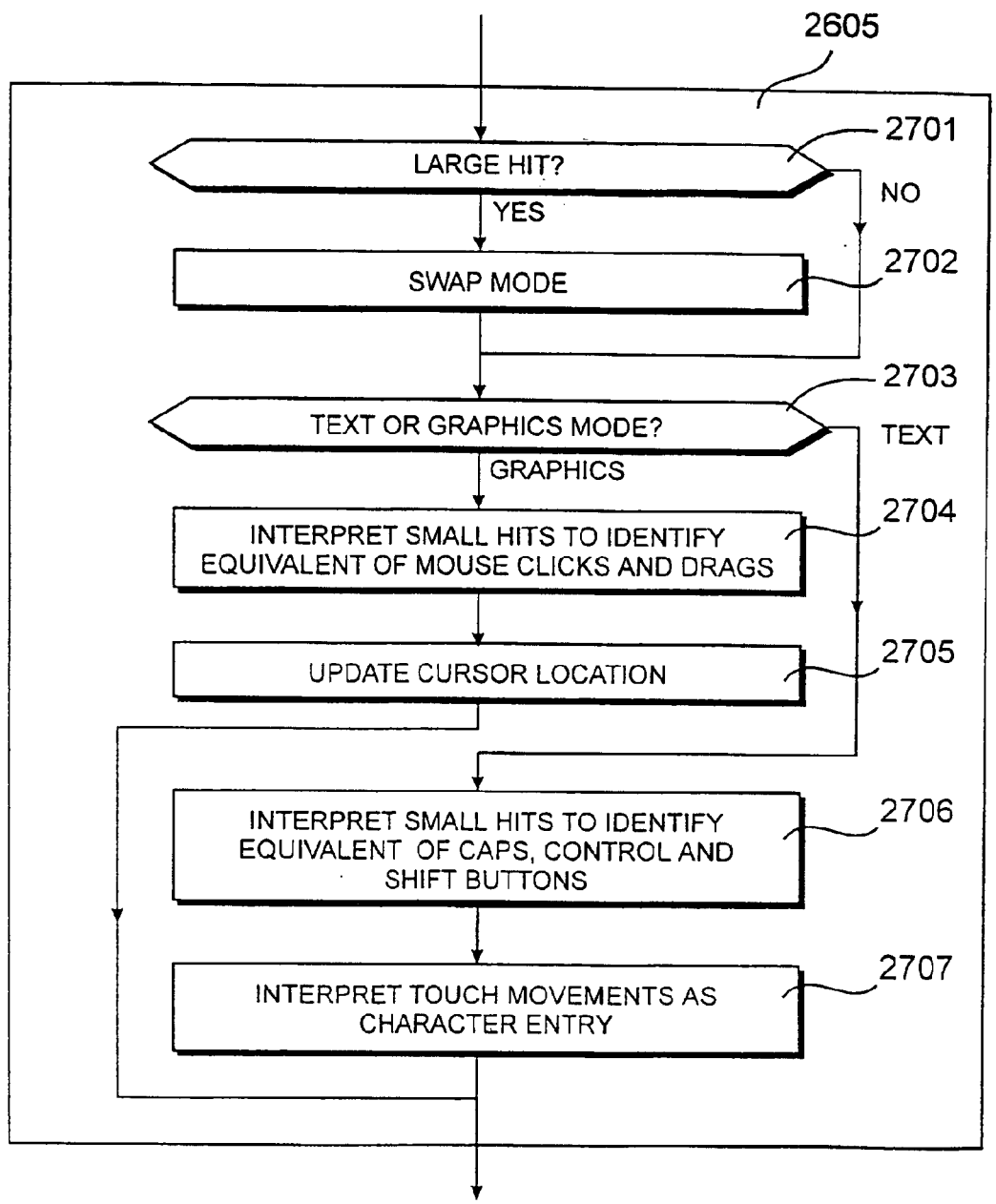
FIG. 27 details the step of processing touch event data shown in FIG. 26.

The step of processing touch event data 2605, shown in FIG. 26, is detailed in FIG. 27. At step 2701 a question is asked as to whether a large hit has been received. A large hit is one where audio data from all four microphone channels is extremely loud, indicating the user has hit the sensor quite hard, request a change of mode. If a large hit is received, control is directed to step 2702 where the current mode is swapped. Alternatively, if a large hit is not identified at step 2701, control is directed to step 2703. At step 2703 a question is asked as to whether the currently selected mode for the sensor is graphics mode or text mode. If text mode is selected, control is directed to step 2706. Alternatively, graphics mode is identified, and control is directed to step 2704. At step 2704 any small hits are interpreted as the equivalent of mouse button clicks. Finger drag events are used to modify the X and Y co-ordinates of the cursor. At step 2705 the cursor position is updated.

When used in text mode, control is directed from step 2703 to step 2706. At step 2706 any small hits are interpreted as the equivalent of CAPS, CTRL and SHIFT events on a conventional keyboard. At step 2707 touch movements on the surface of the sphere are interpreted as character entry events. Alternatively, for high speed text entry, a form of shorthand can be used.

In an alternative embodiment, the DSP 403 performs data compression of audio signals from the microphones 201 to 204. The compressed audio data is combined with orientation data, and is transmitted to the computer terminal 101 for analysis to determine surface event characteristics.

In the embodiments described above, the sensor is a passive device, requiring a sound to be made by a touch event on the surface of the sphere. In an alternative embodiment, an active sensor is provided. Sound may be injected into the surface of the sphere, and a surface pressure map may be constructed from sound characteristics that result from interference and reflection. If the sensor shell is made of a hard material, ultrasonic sound may be used to generate a highly detailed pressure map. The pressure data may be used to facilitate additional methods of data entry. An alternative method of detecting pressure is the use of multiplexed pressure sensitive electrical sensors, whose conductivity changes in accordance with the applied pressure.

In a further alternative embodiment, touch events are detected by an electrical sensor in which capacitance of electrical conductors, near or embedded in the sphere's surface, is modified by the presence of parts of a hand or finger.

The spherical shape of the sensor facilitates rotation in any degree without this making any difference to the appearance or feel presented to the user. Touch events on the surface are made with respect to the computer display 102. This has the psychological effect of extending the computer generated environment out into the space between the user and the terminal.

Although in the preferred embodiment the entire surface of the sphere is touch sensitive, it is possible that, for the purpose of providing a direct electrical connection during recharging, that a different embodiment may include an insignificant portion of its surface where touch sensing is not fully provided. Also, in certain embodiments, the spherical shape may be distorted, as a result of squeezing or due to a preferred distorted shape.

The sphere, being the simplest of three dimensional shapes, provides a suitable shape for universal object mapping. A complex shape, such as a telephone handset, may have its surface mapped to the surface of the spherical sensor 104, and interaction with the handset, for example to dial a number, may be effected via interactions with the sphere. Alternatively, the shape of a three-dimensional object mapped in such a way may be modified using the touch events on the sensor's surface. The shape, then changed, is remapped to the surface of the sphere, so that additional changes may be made. The universal shape of the sphere lends itself to interaction with a rich variety of complex shapes and forms.

What is claimed is:

1. A method of determining the location of contact between a moving fingertip and a surface across which it is moving, comprising the steps of:
    generating random sound at the location of said contact by a process of substantially continuous frictional interaction between said surface and said moving fingertip,
    conducting sound waves from the location of said interaction to at least one microphone via sound-conducting material,
    analyzing signals from said at least one microphone, and
    processing results of said analysis to identify said location of contact.

2. The method of claim 1, wherein said surface is optimized for a combination of smoothness to the sense of touch and generating random sound by friction.

3. The method of claim 1, wherein said step of conducting sound waves includes conducting said sound waves to a plurality of microphones at a plurality of respective microphone locations.

4. The method of claim 1, wherein said step of analyzing signals includes frequency domain analysis.

5. The method of claim 4, wherein said step of analyzing signals includes frequency domain analysis for a plurality of respective microphone signals.

6. The method of claim 1, wherein said step of processing results includes combining results of frequency domain analysis for a plurality of respective microphone signals.

7. The method of claim 1, wherein said step of processing results includes comparing a result of said analysis with templates representing known locations on said surface.

8. The method of claim 7, wherein a location is identified by interpolating between selected location templates.

9. The method of claim 1, wherein a sequence of touch locations determined over time is used to select a text character or characters for text input to a computer system.

10. A touch-operable input device comprising:
    a surface for generating random sound by a process of substantially continuous frictional interaction with a moving fingertip,
    at least one microphone arranged to receive sound waves from the location of said frictional interaction via sound-conducting material, and
    means for supplying signals to processing means configured to identify a fingertip location by processing signals from said at least one microphone.

11. The touch-operable input device of claim 10, wherein said surface is a solid surface.

12. The touch-operable input device of claim 10, wherein said surface is optimized for a combination of smoothness to the sense of touch and generating random sound by friction.

13. The touch-operable input device of claim 10, further including said processing means.

14. The touch-operable input device of claim 13, wherein said processing means is configured to perform the steps of:
    performing a frequency domain analysis of signals from said at least one microphone, and
    processing results of said frequency domain analysis to identify said location of contact.

15. The touch-operable input device of claim 14, further including a template memory storing templates of known touch locations.

16. The touch-operable input device of claim 15, including the additional step of comparing a result of said analysis with templates representing known locations on said surface.

17. The touch-operable input device of claim 16, including the further additional step of identifying a location by interpolating between selected location templates.

18. The touch-operable input device of claim 10, including a plurality of microphone means.

19. The touch-operable input device of claim 10, wherein said surface is curved.

* * * * *